United States Patent
Sonobe et al.

(10) Patent No.: US 10,044,026 B2
(45) Date of Patent: Aug. 7, 2018

(54) PASTE COMPOSITION FOR LITHIUM ION SECONDARY BATTERY NEGATIVE ELECTRODE-USE, COMPOSITE PARTICLES FOR LITHIUM ION SECONDARY BATTERY NEGATIVE ELECTRODE-USE, SLURRY COMPOSITION FOR LITHIUM ION SECONDARY BATTERY NEGATIVE ELECTRODE-USE, NEGATIVE ELECTRODE FOR LITHIUM ION SECONDARY BATTERY-USE, AND LITHIUM ION SECONDARY BATTERY

(71) Applicant: ZEON CORPORATION, Chiyoda-ku, Tokyo (JP)

(72) Inventors: Kenya Sonobe, Tokyo (JP); Yasuhiro Isshiki, Tokyo (JP); Masanori Shibuya, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/519,161

(22) PCT Filed: Oct. 30, 2015

(86) PCT No.: PCT/JP2015/005481
§ 371 (c)(1),
(2) Date: Apr. 14, 2017

(87) PCT Pub. No.: WO2016/067633
PCT Pub. Date: May 6, 2016

(65) Prior Publication Data
US 2017/0244095 A1 Aug. 24, 2017

(30) Foreign Application Priority Data

Oct. 31, 2014 (JP) .................................. 2014-222823
Mar. 13, 2015 (JP) .................................. 2015-051212

(51) Int. Cl.
*H01M 4/133* (2010.01)
*C08F 220/56* (2006.01)
*C08F 220/06* (2006.01)
*C09D 5/24* (2006.01)
*C09D 133/02* (2006.01)
*C09D 133/26* (2006.01)
(Continued)

(52) U.S. Cl.
CPC ........... *H01M 4/133* (2013.01); *C08F 220/06* (2013.01); *C08F 220/56* (2013.01); *C09D 5/24* (2013.01); *C09D 133/02* (2013.01); *C09D 133/26* (2013.01); *H01M 2/1653* (2013.01); *H01M 4/131* (2013.01); *H01M 4/364* (2013.01); *H01M 4/483* (2013.01); *H01M 4/525* (2013.01); *H01M 4/587* (2013.01); *H01M 4/623* (2013.01); *H01M 4/625* (2013.01); *H01M 4/661* (2013.01); *H01M 10/0525* (2013.01); *H01M 10/0567* (2013.01); *H01M 10/0568* (2013.01); *H01M 10/0569* (2013.01); *H01M 10/0587* (2013.01); *C08K 3/04* (2013.01); *C08K 3/34* (2013.01); *C08K 2201/001* (2013.01); *H01M 4/0404* (2013.01); *H01M 4/0435* (2013.01); *H01M 4/0471* (2013.01); *H01M 4/1393* (2013.01); *H01M 2004/027* (2013.01); *H01M 2004/028* (2013.01); *H01M 2300/0037* (2013.01)

(58) Field of Classification Search
CPC .... H01M 4/133; H01M 2/1653; H01M 4/131; H01M 4/483; H01M 4/4525; H01M 4/4587; H01M 4/623; H01M 4/625; H01M 4/661; H01M 10/0525; H01M 10/0567; H01M 10/0568; H01M 10/0569; H01M 10/0587; H01M 4/0404; H01M 4/0435; H01M 4/0471; H01M 4/1393; C08F 220/06; C08F 220/56; C09D 5/24; C09D 133/02; C09D 133/26; C08K 3/04; C08K 3/34; C08K 3/02; C08K 2201/001
See application file for complete search history.

(56) References Cited

U.S. PATENT DOCUMENTS

2017/0062828 A1    3/2017  Sonobe et al.

FOREIGN PATENT DOCUMENTS

JP    2008251965 A    10/2008
JP    2012204303 A    10/2012
(Continued)

OTHER PUBLICATIONS

Feb. 2, 2016, International Search Report issued in the International Patent Application No. PCT/JP2015/005481.
(Continued)

*Primary Examiner* — Helen Oi K Conley
(74) *Attorney, Agent, or Firm* — Kenja IP Law PC

(57) ABSTRACT

A material for slurry composition-use for example is a paste composition including a negative electrode active material that contains a silicon-based negative electrode active material in an amount of at least 30 mass % and a water-soluble polymer in an amount of at least 3 parts by mass and less than 500 parts by mass per 100 parts by mass of the silicon-based negative electrode active material. The water-soluble polymer includes at least 20.0 mass % and no greater than 79.5 mass % of structural units derived from an ethylenically unsaturated carboxylic acid compound (A) and at least 20.0 mass % and no greater than 79.5 mass % of structural units derived from a copolymerizable compound (B) that has an ethylenically unsaturated bond and a water solubility of at least 7 g/100 g at 20° C., and the water-soluble polymer has a degree of swelling in electrolysis solution of less than 120%.

13 Claims, No Drawings

(51) Int. Cl.
| | |
|---|---|
| H01M 4/131 | (2010.01) |
| H01M 4/36 | (2006.01) |
| H01M 4/525 | (2010.01) |
| H01M 4/48 | (2010.01) |
| H01M 4/587 | (2010.01) |
| H01M 4/62 | (2006.01) |
| H01M 4/66 | (2006.01) |
| H01M 10/0525 | (2010.01) |
| H01M 10/0587 | (2010.01) |
| H01M 2/16 | (2006.01) |
| H01M 10/0568 | (2010.01) |
| H01M 10/0569 | (2010.01) |
| H01M 10/0567 | (2010.01) |
| C08K 3/34 | (2006.01) |
| C08K 3/04 | (2006.01) |
| H01M 4/02 | (2006.01) |
| H01M 4/04 | (2006.01) |
| H01M 4/1393 | (2010.01) |

(56) References Cited

FOREIGN PATENT DOCUMENTS

| JP | 2014089834 A | 5/2014 |
|---|---|---|
| WO | 2015186363 A1 | 12/2015 |

OTHER PUBLICATIONS

May 2, 2017, International Preliminary Report on Patentability issued in the International Patent Application No. PCT/JP2015/005481.

May 14, 2018, the Extended European Search Report issued by the European Patent Office in the corresponding European Patent Application No. 15854823.0.

May 18, 2018, the Extended European Search Report issued by the European Patent Office in the corresponding European Patent Application No. 15853835.5.

PASTE COMPOSITION FOR LITHIUM ION SECONDARY BATTERY NEGATIVE ELECTRODE-USE, COMPOSITE PARTICLES FOR LITHIUM ION SECONDARY BATTERY NEGATIVE ELECTRODE-USE, SLURRY COMPOSITION FOR LITHIUM ION SECONDARY BATTERY NEGATIVE ELECTRODE-USE, NEGATIVE ELECTRODE FOR LITHIUM ION SECONDARY BATTERY-USE, AND LITHIUM ION SECONDARY BATTERY

TECHNICAL FIELD

The present disclosure relates to a paste composition for lithium ion secondary battery negative electrode-use, composite particles for lithium ion secondary battery negative electrode-use, a slurry composition for lithium ion secondary battery negative electrode-use, a negative electrode for lithium ion secondary battery-use, and a lithium ion secondary battery.

BACKGROUND

Lithium ion secondary batteries have characteristics such as compact size, light weight, high energy-density, and the ability to be repeatedly charged and discharged, and are used in a wide variety of applications. Consequently, in recent years, studies have been made to improve battery members such as electrodes for the purpose of achieving even higher lithium ion secondary battery performance.

Specifically, studies have been made to increase the battery capacity of a lithium ion secondary battery by adopting silicon-based negative electrode active material as the negative electrode active material used in the negative electrode of the lithium ion secondary battery.

While a silicon-based negative electrode active material has a high theoretical capacity and can increase the battery capacity of a lithium ion secondary battery, such material also has the following problems.

Specifically, silicon-based negative electrode active material greatly expands and contracts in association with charging and discharging. Accordingly, in a negative electrode that uses silicon-based negative electrode active material, the expansion and contraction of the silicon-based negative electrode active material in association with repeated charging and discharging may cause the silicon-based negative electrode active material itself to deteriorate (i.e. to reduce in size due to structural fracture of the silicon-based negative electrode active material) and/or may lead to fracture of the electrode structure that destroys the conductive path in the negative electrode.

Also, a negative electrode for lithium ion secondary battery-use is typically produced by applying, on a current collector, a slurry composition for lithium ion secondary battery negative electrode-use in which a negative electrode active material and a binding material are dispersed and/or dissolved in a solvent such as water. The slurry composition is then dried to form a negative electrode mixed material layer, which includes the negative electrode active material and the binding material, on the current collector. A silicon-based negative electrode active material, however, easily aggregates in a solvent such as water, which may cause silicon-based negative electrode active material to become unevenly distributed in the negative electrode mixed material layer.

For these reasons, it has been difficult for a lithium ion secondary battery that uses a silicon-based negative electrode active material to achieve excellent cycle characteristics.

To address the above-described issues, for example a technique has been proposed to improve the cycle characteristics of a lithium ion secondary battery by adding a polymer with high affinity for silicon-based negative electrode active material to the slurry composition for negative electrode-use. For example, JP 2014-89834 A (PTL 1) reports that in a slurry composition for negative electrode-use formed by dispersing a silicon-based negative electrode active material in water, a water-soluble polymer that includes 0.1% to 30% by weight of a silicon-containing monomer unit and 20% to 60% by weight of an acid group-containing monomer unit has excellent affinity for a silicon-based negative electrode active material. This water-soluble polymer therefore contributes to improving the dispersibility of the silicon-based negative electrode active material and causes a lithium ion secondary battery to achieve excellent cycle characteristics.

CITATION LIST

Patent Literature

PTL 1: JP 2014-89834 A

SUMMARY

Technical Problem

In the aforementioned conventional technique, however, the expansion and contraction of the silicon-based negative electrode active material in association with charging and discharging cannot be sufficiently suppressed. Furthermore, there is also room for improvement in the dispersibility of the silicon-based negative electrode active material within the slurry composition. Hence, there has been a desire for further improvement in the cycle characteristics of a lithium ion secondary battery that uses a silicon-based negative electrode active material as the negative electrode active material.

Therefore, one objective of the present disclosure is to provide a material for slurry composition-use that allows formation of a slurry composition for lithium ion secondary battery negative electrode-use which in turn enables a lithium ion secondary battery using a silicon-based negative electrode active material to achieve excellent cycle characteristics.

Another objective of the present disclosure is to provide a slurry composition for lithium ion secondary battery negative electrode-use that allows formation of a negative electrode mixed material layer which in turn enables a lithium ion secondary battery using a silicon-based negative electrode active material to achieve excellent cycle characteristics.

A further objective of the present disclosure is to provide a negative electrode for lithium ion secondary battery-use that can allow a lithium ion secondary battery using a silicon-based negative electrode active material to achieve excellent cycle characteristics.

Yet another objective of the present disclosure is to provide a lithium ion secondary battery having high battery capacity and excellent cycle characteristics.

Solution to Problem

We conducted diligent investigation with the aim of solving the problems described above. As a result, we discovered that, when preparing an aqueous slurry composition for negative electrode-use that includes a silicon-based negative electrode active material, the use of a material for slurry composition-use obtained by mixing a silicon-based negative electrode active material and a particular water-soluble polymer in advance allows the negative electrode formed using the slurry composition for negative electrode-use to cause a lithium ion secondary battery to achieve excellent cycle characteristics. This discovery led to the present disclosure.

In order advantageously to solve the problems described above, a paste composition for lithium ion secondary battery negative electrode-use of the present disclosure comprises: a negative electrode active material and a water-soluble polymer; wherein the negative electrode active material includes a silicon-based negative electrode active material, and a percentage content of the silicon-based negative electrode active material in the negative electrode active material is at least 30 mass %; the water-soluble polymer is obtained through polymerization of a monomer composition including: an ethylenically unsaturated carboxylic acid compound (A) composed of either or both of an ethylenically unsaturated carboxylic acid and an ethylenically unsaturated carboxylic acid salt; and a copolymerizable compound (B) that has an ethylenically unsaturated bond and a solubility of at least 7 g in 100 g of water at 20° C.; in the monomer composition, a percentage content of the ethylenically unsaturated carboxylic acid compound (A) among all monomers is at least 20.0 mass % and no greater than 79.5 mass %, and a percentage content of the compound (B) among all monomers is at least 20.0 mass % and no greater than 79.5 mass %; the water-soluble polymer has a degree of swelling in electrolysis solution of less than 120%; and a content of the water-soluble polymer is at least 3 parts by mass and less than 500 parts by mass per 100 parts by mass of the silicon-based negative electrode active material. By forming a slurry composition using a paste composition for lithium ion secondary battery negative electrode-use that includes a silicon-based negative electrode active material and a water-soluble polymer at a predetermined quantity ratio, the water-soluble polymer being obtained through polymerization of a monomer composition including the ethylenically unsaturated carboxylic acid compound (A) and the compound (B) at predetermined percentage contents and having a degree of swelling in electrolysis solution of less than 120%, the negative electrode obtained using the slurry composition can allow a lithium ion secondary battery using the silicon-based negative electrode active material to achieve excellent cycle characteristics.

In the paste composition for lithium ion secondary battery negative electrode-use of the present disclosure, the monomer composition preferably further includes a multifunctional compound (C) having a polyoxyalkylene structure and at least two ethylenically unsaturated bonds, and a percentage content of the multifunctional compound (C) among all monomers in the monomer composition is preferably at least 0.1 mass % and no greater than 20.0 mass %. As a result of the water-soluble polymer being formed using the monomer composition containing the multifunctional compound (C) with the above-described percentage content, internal resistance of the lithium ion secondary battery can be reduced while increasing the preservation stability, and the cycle characteristics can be further improved. Moreover, as a result of the multifunctional compound (C) being contained in the monomer composition, the solid content concentration of a slurry composition prepared using the paste composition of the present disclosure can be increased in order to improve negative electrode producibility.

In the paste composition for lithium ion secondary battery negative electrode-use of the present disclosure, a value obtained by dividing the percentage content of the ethylenically unsaturated carboxylic acid compound (A) among all monomers in the monomer composition by the percentage content of the compound (B) among all monomers in the monomer composition is preferably less than 1.5. When the percentage content of the ethylenically unsaturated carboxylic acid compound (A) among all monomers in the monomer composition and the percentage content of the compound (B) among all monomers in the monomer composition satisfy the aforementioned relationship, a reduction of the internal resistance of the lithium ion secondary battery and an increase in the cycle characteristics can be achieved in a balanced manner.

In the paste composition for lithium ion secondary battery negative electrode-use of the present disclosure, the monomer composition may further include a compound (D) composed of at least one selected from the group consisting of an ethylenically unsaturated sulfonic acid, an ethylenically unsaturated sulfonic acid salt, an ethylenically unsaturated phosphoric acid, and an ethylenically unsaturated phosphoric acid salt, and a percentage content of the compound (D) among all monomers in the monomer composition is preferably at least 0.4 mass % and no greater than 30.0 mass %. As a result of the water-soluble polymer being formed using the monomer composition containing the compound (D) with the above-described percentage content, close adherence between a current collector and a negative electrode mixed material layer that is formed using the paste composition, along with producibility of the negative electrode, can be guaranteed. Also, swelling of the negative electrode can be suppressed, and the cycle characteristics of a lithium ion secondary battery can be further improved.

When the monomer composition includes a predetermined percentage content of the compound (D) as described above, a value obtained by dividing a sum of the percentage content of the ethylenically unsaturated carboxylic acid compound (A) among all monomers in the monomer composition and the percentage content of the compound (D) among all monomers in the monomer composition by the percentage content of the compound (B) among all monomers in the monomer composition is preferably less than 1.5. When the percentage contents of the ethylenically unsaturated carboxylic acid compound (A), the compound (B), and the compound (D) among all monomers in the monomer composition satisfy the aforementioned relationship, the close adherence between the negative electrode mixed material layer and the current collector can be increased, as can the preservation stability. Also, the cycle characteristics can be further improved. Additionally, the internal resistance of a lithium ion secondary battery can be reduced because the water-soluble polymer maintains the separation between particles of a negative electrode active material and ensures lithium ion conductivity, without swelling excessively in an electrolysis solution.

In the paste composition for lithium ion secondary battery negative electrode-use of the present disclosure, the water-soluble polymer preferably includes a lithium carboxylate group. When the water-soluble polymer has a lithium carboxylate group (—COOLi), the stability of the slurry composition obtained using the paste composition increases, and while increasing the close adherence between the negative electrode mixed material layer and the current collector, swelling of the negative electrode can be suppressed. Also, while further improving the cycle characteristics of the lithium ion secondary battery, the preservation stability can also be enhanced, and the internal resistance can be reduced.

In order advantageously to solve the problems described above, composite particles for lithium ion secondary battery negative electrode-use of the present disclosure are obtained by subjecting any of the above-described paste compositions for lithium ion secondary battery negative electrode-use to dry granulation. By preparing a slurry composition using composite particles for lithium ion secondary battery negative electrode-use obtained by subjecting any of the above-described paste compositions for lithium ion secondary battery negative electrode-use to dry granulation, the negative electrode obtained using the slurry composition can allow a lithium ion secondary battery using the silicon-based negative electrode active material to achieve excellent cycle characteristics.

In order advantageously to solve the problems described above, a slurry composition for lithium ion secondary battery negative electrode-use of the present disclosure is prepared using at least one selected from the group consisting of the above-described paste composition for lithium ion secondary battery negative electrode-use and the above-described composite particles for lithium ion secondary battery negative electrode-use. By preparing a slurry composition using the above-described paste composition and/or composite particles as the material for slurry composition-use, the negative electrode obtained using the slurry composition can allow a lithium ion secondary battery using the silicon-based negative electrode active material to achieve excellent cycle characteristics.

In order advantageously to solve the problems described above, a negative electrode for lithium ion secondary battery-use of the present disclosure comprises, on a current collector, a negative electrode mixed material layer prepared using the above-described slurry composition for lithium ion secondary battery negative electrode-use. In this way, by forming a negative electrode mixed material layer using the above-described slurry composition, the resulting negative electrode for lithium ion secondary battery-use allows a lithium ion secondary battery using a silicon-based negative electrode active material to achieve excellent cycle characteristics.

Furthermore, in order advantageously to solve the problems described above, a lithium ion secondary battery of the present disclosure comprises a positive electrode, a negative electrode, an electrolysis solution, and a separator, wherein the negative electrode is the above-described negative electrode for lithium ion secondary battery-use. In this way, by using the above-described negative electrode for lithium ion secondary battery-use, a lithium ion secondary battery having high battery capacity and excellent cycle characteristics can be provided.

Advantageous Effect

According to the present disclosure, it is possible to provide a material for slurry composition-use that allows formation of a slurry composition for lithium ion secondary battery negative electrode-use which in turn enables a lithium ion secondary battery using a silicon-based negative electrode active material to achieve excellent cycle characteristics.

According to the present disclosure, it is also possible to provide a slurry composition for lithium ion secondary battery negative electrode-use that allows formation of a negative electrode mixed material layer which in turn enables a lithium ion secondary battery using a silicon-based negative electrode active material to achieve excellent cycle characteristics.

Furthermore, according to the present disclosure, it is possible to provide a negative electrode for lithium ion secondary battery-use that allows a lithium ion secondary battery using a silicon-based negative electrode active material to achieve excellent cycle characteristics.

According to the present disclosure, it is also possible to provide a lithium ion secondary battery having high battery capacity and excellent cycle characteristics.

DETAILED DESCRIPTION

The following provides a detailed description of embodiments of the present disclosure.

The paste composition for lithium ion secondary battery negative electrode-use of the present disclosure and the composite particles for lithium ion secondary battery negative electrode-use of the present disclosure obtained by subjecting the paste composition to dry granulation can both be used as a material for slurry composition-use in order to prepare a slurry composition for lithium ion secondary battery negative electrode-use. The slurry composition for lithium ion secondary battery negative electrode-use of the present disclosure is prepared using either or both of the paste composition for lithium ion secondary battery negative electrode-use and the composite particles for lithium ion secondary battery negative electrode-use of the present disclosure and is used to form the negative electrode of a lithium ion secondary battery. The negative electrode for lithium ion secondary battery-use of the present disclosure may be produced using the slurry composition for lithium ion secondary battery negative electrode-use of the present disclosure. Furthermore, the lithium ion secondary battery of the present disclosure includes the negative electrode for lithium ion secondary battery-use of the present disclosure.

(Paste Composition for Lithium Ion Secondary Battery Negative Electrode-Use)

The paste composition for lithium ion secondary battery negative electrode-use of the present disclosure is a composition that is formed by mixing at least a silicon-based negative electrode active material and a particular water-soluble polymer before preparing the slurry composition for lithium ion secondary battery negative electrode-use of the present disclosure.

The paste composition for lithium ion secondary battery negative electrode-use of the present disclosure includes a negative electrode active material, in which the percentage content of a silicon-based negative electrode active material is at least 30 mass %, and a water-soluble polymer in an amount of at least 3 parts by mass and less than 500 parts by mass per 100 parts by mass of the silicon-based negative electrode active material, the water-soluble polymer being dispersed and/or dissolved in a solvent of water. The water-soluble polymer used as this water-soluble polymer is obtained through polymerization of a monomer composition including, at predetermined percentage contents, an ethylenically unsaturated carboxylic acid compound (A) composed of either or both of an ethylenically unsaturated carboxylic acid and an ethylenically unsaturated carboxylic acid salt and a copolymerizable compound (B) that has an ethylenically unsaturated bond and a solubility of at least 7 g in 100 g of water at 20° C., and the water-soluble polymer has a degree of swelling in electrolysis solution of less than 120%.

<Water-Soluble Polymer>

The water-soluble polymer included in the paste composition for lithium ion secondary battery negative electrode-use of the present disclosure is a water-soluble copolymer.

Herein, when a polymer is referred to as "water-soluble", this means that when 1 part by mass (solid content equivalent) of the polymer is added to 100 parts by mass of deionized water and is stirred to obtain a mixture that is then adjusted to a temperature of at least 20° C. and no higher than 70° C. and a pH of at least 3 and no greater than 12 (pH adjustment is performed using NaOH aqueous solution and/or HCl aqueous solution), and is caused to pass through a 250 mesh screen, the mass of solid content that remains as a residue on the screen without passing through does not exceed 50 mass % of the solid content of the initially added polymer (note that this result is obtained for at least one set of conditions that satisfy the aforementioned temperature and pH ranges).

The water-soluble polymer is a component that functions as a dispersant that can improve the dispersibility of a negative electrode active material, in particular of a silicon-based negative electrode active material which easily aggregates in a solvent such as water. The water-soluble polymer also has a binding capacity. Accordingly, in a negative electrode produced by preparing a slurry composition using the paste composition of the present disclosure and then forming a negative electrode mixed material layer on a current collector using the slurry composition, the water-soluble polymer also functions as a binding material that can hold the components included in the negative electrode mixed material layer to prevent detachment from the negative electrode mixed material layer.

Here, a slurry composition is prepared using the paste composition of the present disclosure, which has blended therein, at a particular quantity ratio, a silicon-based negative electrode active material and a water-soluble polymer that is obtained through polymerization of a monomer composition including the ethylenically unsaturated carboxylic acid compound (A) and the compound (B) at predetermined percentage contents and that has a degree of swelling in electrolysis solution of less than 120%. By then using the slurry composition to create a negative electrode, a lithium ion secondary battery that uses the silicon-based negative electrode active material can be caused to achieve excellent cycle characteristics.

It is not clear why the cycle characteristics of the lithium ion secondary battery improve after preparing the aforementioned paste composition that includes the water-soluble polymer and the silicon-based negative electrode active material and using the above-described method to prepare a slurry composition using the paste composition, but the reasons are presumed to be as follows.

By mixing the water-soluble polymer and the silicon-based negative electrode active material in a silicon-based negative electrode active material-rich state, the water-soluble polymer adsorbs on the surface of the silicon-based negative electrode active material due to the contribution of the carboxyl group or carboxyl group salt of the ethylenically unsaturated carboxylic acid compound (A) and suitably covers the active material. It is presumed that the cycle characteristics improve by suppression of aggregation of silicon-based negative electrode active material in the slurry composition prepared using the paste composition, an increase in the dispersibility of the silicon-based negative electrode active material in the negative electrode mixed material layer, and suppression of surface deterioration of the negative electrode active material.

Also, the compound (B) used in preparation of the water-soluble polymer has high solubility in water and is thus a highly polar monomer. Consequently, the resultant water-soluble polymer has low affinity for an electrolysis solution that is typically used in a lithium ion secondary battery, thereby suppressing the swelling of the water-soluble polymer X in the electrolysis solution to an appropriate level (i.e. to less than 120%). Therefore, the structure of the electrode plate is preserved, and swelling of the negative electrode is suppressed, which is also presumed to improve the cycle characteristics.

By adsorbing the water-soluble polymer on the surface of the silicon-based negative electrode active material before preparing the slurry composition, the solid content concentration of a slurry composition prepared using the paste composition of the present disclosure can be improved, and the producibility of the negative electrode can also be improved.

[Monomer Composition]

The water-soluble polymer used in the paste composition for lithium ion secondary battery negative electrode-use of the present disclosure is obtained through polymerization of the monomer composition described below in detail. The ratio of structural units in the water-soluble polymer that are derived from monomers contained in the monomer composition is normally the same as the ratio in which these monomers are present in the monomer composition.

Also, the monomer composition used in preparation of the water-soluble polymer for example contains monomers, additives such as a polymerization initiator, and a polymerization solvent. Moreover, the monomer composition contains the ethylenically unsaturated carboxylic acid compound (A) and the compound (B) at predetermined percentage contents as monomers. Specifically, the monomer composition contains at least 20.0 mass % and no greater than 79.5 mass % of the ethylenically unsaturated carboxylic acid compound (A) and contains at least 20.0 mass % and no greater than 79.5 mass % of the compound (B), where the amount of all monomers in the monomer composition is taken to be 100 mass %. In other words, the water-soluble polymer includes at least 20.0 mass % and no greater than 79.5 mass % of structural units derived from the ethylenically unsaturated carboxylic acid compound (A) and at least 20.0 mass % and no greater than 79.5 mass % of structural units derived from compound (B).

The monomer composition may contain a compound that is copolymerizable with the ethylenically unsaturated carboxylic acid compound (A) and the compound (B). Specifically, the monomer composition may contain, as a monomer, a multifunctional compound (C); a compound (D) composed of at least one selected from the group consisting of an ethylenically unsaturated sulfonic acid, an ethylenically unsaturated sulfonic acid salt, an ethylenically unsaturated phosphoric acid, and an ethylenically unsaturated phosphoric acid salt; and any compound other than these.

—Ethylenically Unsaturated Carboxylic Acid Compound (A)—

The ethylenically unsaturated carboxylic acid compound (A) can be either or both of an ethylenically unsaturated carboxylic acid and an ethylenically unsaturated carboxylic acid salt. Examples of ethylenically unsaturated carboxylic acids that can be used include ethylenically unsaturated monocarboxylic acids, derivatives of ethylenically unsaturated monocarboxylic acids, ethylenically unsaturated dicarboxylic acids, acid anhydrides of ethylenically unsaturated dicarboxylic acids, and derivatives of ethylenically unsaturated dicarboxylic acids. Examples of ethylenically unsaturated carboxylic acid salts that can be used include sodium salts, potassium salts, and lithium salts of ethylenically unsaturated carboxylic acids.

One type of ethylenically unsaturated carboxylic acid or ethylenically unsaturated carboxylic acid salt may be used individually, or two or more types of ethylenically unsaturated carboxylic acids and/or ethylenically unsaturated carboxylic acid salts may be used in combination in a freely selected ratio.

Examples of ethylenically unsaturated monocarboxylic acids that can be used include acrylic acid, methacrylic acid, and crotonic acid. Examples of derivatives of ethylenically unsaturated monocarboxylic acids that can be used include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of ethylenically unsaturated dicarboxylic acids that can be used include maleic acid, fumaric acid, and itaconic acid. Examples of acid anhydrides of ethylenically unsaturated dicarboxylic acids that can be used include maleic anhydride, diacrylic acid anhydride, methyl maleic anhydride, and dimethyl maleic anhydride. Examples of derivatives of ethylenically unsaturated dicarboxylic acids that can be used include methylmaleic acid, dimethylmaleic acid, phenylmaleic acid, chloromaleic acid, dichloromaleic acid, and fluoromaleic acid.

An ethylenically unsaturated carboxylic acid salt can be used as the ethylenically unsaturated carboxylic acid compound (A), with a lithium salt of an ethylenically unsaturated carboxylic acid being preferable. By using an ethylenically unsaturated carboxylic acid salt, the water-solubility of the resulting water-soluble polymer can be improved. Therefore, when preparing a water-soluble polymer using water as a polymerization solvent, polymerization can be prevented from progressing inhomogeneously due to precipitation of the water-soluble polymer, even if the monomer concentration in the monomer composition is high. Accordingly, polymerization can be caused to progress homogeneously while increasing producibility through use of a monomer composition that has a high monomer concentration. Also, if a lithium salt of an ethylenically unsaturated carboxylic acid is used, slurry composition stability is improved by introduction of a lithium carboxylate group (—COOLi) into the resultant water-soluble polymer. The close adherence between the negative electrode mixed material layer and the current collector and the preservation stability of the lithium ion secondary battery can also be increased, the cycle characteristics of the lithium ion secondary battery can be further improved, and the internal resistance can be reduced.

In order to suppress swelling of the negative electrode of the lithium ion secondary battery and further improve cycle characteristics, and also to reduce internal resistance, acrylic acid, methacrylic acid, an acrylic acid salt, or a methacrylic acid salt is preferably used as the ethylenically unsaturated carboxylic acid compound, with acrylic acid or an acrylic acid salt being more preferable.

The percentage content of the above-described ethylenically unsaturated carboxylic acid compound (A) among monomers contained in the monomer composition used in preparation of the water-soluble polymer is required to be at least 20.0 mass % and no greater than 79.5 mass %. The percentage content of the ethylenically unsaturated carboxylic acid compound (A) among these monomers is preferably at least 21.0 mass %, more preferably at least 22.0 mass %, and particularly preferably at least 24.0 mass %, and is preferably no greater than 75.0 mass %, more preferably no greater than 72.0 mass %, even more preferably no greater than 60.0 mass %, and particularly preferably no greater than 50.0 mass %. If the percentage content of the ethylenically unsaturated carboxylic acid compound (A) among the monomers is less than 20.0 mass %, the silicon-based negative electrode active material cannot be sufficiently dispersed by the water-soluble polymer. Additionally, the cycle characteristics of the lithium ion secondary battery are reduced, since the rigidity of the water-soluble polymer is reduced, and the swelling of the negative electrode cannot be sufficiently suppressed. Conversely, if the percentage content of the ethylenically unsaturated carboxylic acid compound (A) among the monomers exceeds 79.5 mass %, the rigidity of the water-soluble polymer becomes excessive, making the water-soluble polymer brittle. As a result, the preservation stability of the lithium ion secondary battery reduces due to the generation of gas or the like. Additionally, if the percentage content of the ethylenically unsaturated carboxylic acid compound (A) among the monomers exceeds 79.5 mass %, the cycle characteristics and the like of the lithium ion secondary battery are reduced. Whereas the water-soluble polymer becomes excessively hydrophilic, ensuring affinity for the silicon-based negative electrode active material, for example the surface adsorbs on graphite that exhibits hydrophobia, making dispersion difficult, which is presumed to be the reason for reduction of the cycle characteristics.

—Compound (B)—

The compound (B) is a copolymerizable compound that has an ethylenically unsaturated bond and a solubility of at least 7 g in 100 g of water at 20° C. The reason for this is that a structural unit derived from the compound (B) having the solubility described above exhibits low swelling with respect to an electrolysis solution and exhibits high polymerizability when water is used as a polymerization solvent. In the present disclosure, even when satisfying the above-described solubility, an ethylenically unsaturated carboxylic acid or ethylenically unsaturated carboxylic acid salt is considered to be included in the ethylenically unsaturated carboxylic acid compound (A) and not in the compound (B), and even when satisfying the above-described solubility, an ethylenically unsaturated sulfonic acid, an ethylenically unsaturated phosphoric acid, an ethylenically unsaturated sulfonic acid salt, or an ethylenically unsaturated phosphoric acid salt is considered to be included in the compound (D) and not in the compound (B).

Examples of the compound (B) include compounds having an ethylenically unsaturated bond and a high polarity functional group (for example, a hydroxy group, an amide group, a nitrile group, or an amino group) such as 2-hydroxypropyl methacrylate (100 or greater), 2-hydroxypropyl acrylate (100 or greater), 2-hydroxyethyl methacrylate (100 or greater), 2-hydroxyethyl acrylate (100 or greater), acrylamide (100 or greater), methacrylamide (100 or greater), dimethacrylamide (100 or greater), diethylacrylamide (100 or greater), N-methylolacrylamide (100 or greater), and acrylonitrile (7); and ethylene glycol dimethacrylate (100 or greater). These monomers can be used alone or in combination of two or more thereof in a freely selected ratio. Note that the numbers shown above in parentheses indicate the water solubility (units: g/100 g) at a temperature of 20° C. The water solubility at a temperature of 20° C. can be measured by the EPA method (EPA Chemical Fate Testing Guideline CG-1500 Water Solubility).

The compound (B) preferably has a solubility of at least 100 g in 100 g of water at 20° C.

If instead of the aforementioned compound (B), the water-soluble polymer is prepared using a compound that has a water solubility of less than 7 g at 20° C., such as methyl acrylate (6), ethyl acrylate (2), or butyl acrylate (2), then the water-soluble polymer swells excessively in an electrolysis solution, so that the structure of an electrode plate cannot be preserved. Consequently, the cycle characteristics and preservation stability of the lithium ion secondary battery cannot be ensured.

Here, in order to reduce the amount of moisture imported into a lithium ion secondary battery and to suppress generation of gas, and in order to ensure the stability of other polymers that can be used together with the water-soluble polymer (for example, a particulate polymer such as the below-described styrene-butadiene copolymer), the compound (B) is preferably not an organic salt such as ammonium salt, or a salt such as sodium salt or potassium salt (in particular a metallic salt), and preferably does not have an acidic group that is easily converted to salt (such as a phenolic hydroxyl group).

Also, in order to suppress swelling of the negative electrode in the electrolysis solution and to improve the cycle characteristics further while suppressing the internal resistance of the lithium ion secondary battery, 2-hydroxyethyl acrylate, acrylamide, N-methylolacrylamide, acrylonitrile, dimethacrylamide, or diethylacrylamide is preferably used as the compound (B), with 2-hydroxyethyl acrylate, acrylamide, or dimethacrylamide being more preferable.

The percentage content of the above-described compound (B) among monomers contained in the monomer composition used in preparation of the water-soluble polymer is required to be at least 20.0 mass % and no greater than 79.5 mass %. The percentage content of the compound (B) among these monomers is preferably at least 30.0 mass %, more preferably at least 40.0 mass %, and even more preferably at least 50.0 mass %, and is preferably no greater than 75.0 mass %, more preferably no greater than 74.0 mass %, and even more preferably no greater than 73.0 mass %. If the percentage content of the compound (B) among the monomers is less than 20.0 mass %, an electrode plate becomes excessively brittle and it may not be possible to preserve the structure of the electrode plate due to formation of cracks or the like. Consequently, cycle characteristics are reduced and preservation stability is also reduced. Moreover, it may not be possible to sufficiently reduce lithium ion secondary battery internal resistance. On the other hand, if the percentage content of the compound (B) among the monomers is greater than 79.5 mass %, lithium ion secondary battery cycle characteristics are reduced since it is not possible to sufficiently suppress swelling of the negative electrode.

The value (A/B) obtained by dividing the percentage content of the ethylenically unsaturated carboxylic acid compound (A) among all monomers by the percentage content of the compound (B) among all monomers is preferably less than 1.5, more preferably no greater than 1.0, and further preferably no greater than 0.8, and is preferably at least 0.2 and more preferably at least 0.3.

By setting A/B to be less than 1.5, the internal resistance of a lithium ion secondary battery can be further reduced, because the water-soluble polymer maintains the separation between particles of a negative electrode active material and ensures lithium ion conductivity, without swelling excessively in an electrolysis solution.

Moreover, reduction of lithium ion secondary battery internal resistance and improvement of lithium ion secondary battery cycle characteristics can be achieved in a good balance as a result of A/B being in the aforementioned range.

—Multifunctional Compound (C)—

The monomer composition preferably contains a multifunctional compound (C) having a polyoxyalkylene structure and at least two ethylenically unsaturated bonds as a monomer. As a result of the multifunctional compound (C) being used in polymerization of the water-soluble polymer, the water-soluble polymer can be provided with suitably high levels of rigidity and flexibility. Accordingly, electrode plate expansion caused by charging and discharging can be suppressed so as to inhibit reduction of cycle characteristics. Moreover, an ethyleneoxide chain, which has high affinity with water, helps to facilitate polymerization of the water-soluble polymer. Furthermore, lithium ion conductivity can be ensured and lithium ion secondary battery internal resistance can be reduced. Moreover, as a result of the multifunctional compound (C) being contained in the monomer composition, the solid content concentration of a slurry composition prepared using the paste composition of the present disclosure can be increased in order to improve negative electrode producibility.

Herein, the multifunctional compound (C) may be a compound having a polyoxyalkylene structure represented by a general formula: —$(C_mH_{2m}O)_n$— (in the formula, m is an integer of greater than or equal to 1 and n is an integer of greater than or equal to 2), and at least two ethylenically unsaturated bonds.

One type of compound having a polyoxyalkylene structure and at least two ethylenically unsaturated bonds may be used individually, or two or more types of such compounds may be used in combination in a freely selected ratio.

Note that in the present disclosure, a compound that is equivalent to the multifunctional compound (C) is a compound that is not included in the compound (B).

The multifunctional compound (C) is for example a poly(meth)acrylate of a polyol having a polyoxyalkylene structure. Specific examples of multifunctional compounds that can be used include, but are not specifically limited to, compounds (I) to (V) shown below.

In the present disclosure, "(meth)acrylate" is used to indicate "acrylate" and/or "methacrylate".

(I) A polyethylene glycol diacrylate represented by the following general formula

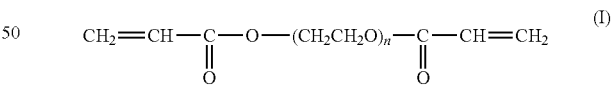

(in the formula, n represents an integer of greater than or equal to 2).

(II) A polytetramethylene glycol diacrylate represented by the following general formula

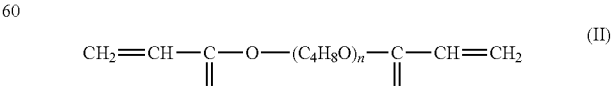

(in the formula, n represents an integer of greater than or equal to 2).

(III) An ethoxylated bisphenol A diacrylate represented by the following general formula

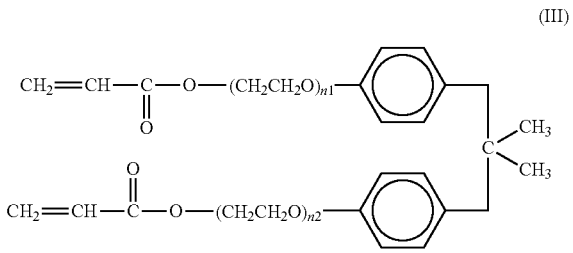

(in the formula, n1 and n2 are integers of greater than or equal to 2 that may be the same or different).

(IV) An ethoxylated glycerin triacrylate represented by the following general formula

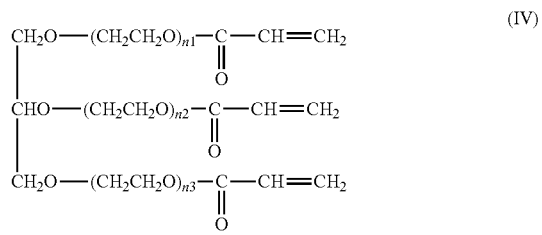

(in the formula, n1, n2, and n3 are integers of greater than or equal to 2 that may be the same or different).

(V) An ethoxylated pentaerythritol tetraacrylate represented by the following general formula

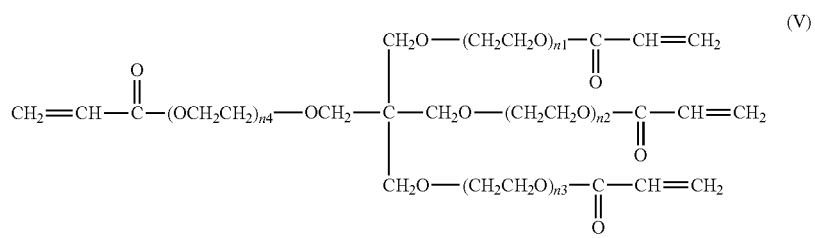

(in the formula, n1, n2, n3, and n4 are integers of greater than or equal to 2 that may be the same or different).

In terms of facilitating polymerization of the water-soluble polymer and allowing an increase in the solid content concentration of a slurry composition prepared using the paste composition of the present disclosure in order to improve negative electrode producibility, the number of ethylenically unsaturated bonds in the multifunctional compound (C) (i.e., the functionality of the multifunctional compound (C)) is preferably at least 2 and no greater than 6, and more preferably at least 2 and no greater than 4.

Moreover, in order to improve negative electrode producibility, the multifunctional compound (C) is preferably a polyacrylate having a functionality of 2-6 and more preferably a polyacrylate having a functionality of 2-4.

Furthermore, in order further to improve stability of a slurry composition prepared using the paste composition of the present disclosure and preservation stability of a lithium ion secondary battery, the integer m in the polyoxyalkylene structure ($-(C_mH_{2m}O)_n-$) of the multifunctional compound (C) is preferably no greater than 20, more preferably no greater than 15, and particularly preferably no greater than 10, and is preferably at least 2. Slurry composition stability may be reduced if the integer m is excessively large. On the other hand, rigidity of the water-soluble polymer may be increased and preservation stability of a lithium ion secondary battery may be reduced if the integer m is excessively small.

For the same reasons as described above, the integer n in the polyoxyalkylene structure ($-(C_mH_{2m}O)_n-$) of the multifunctional compound (C) is preferably no greater than 20, more preferably no greater than 15, and particularly preferably no greater than 10, and is preferably at least 2, more preferably at least 3, and particularly preferably at least 4. Slurry composition stability may be reduced if the integer n is excessively large. On the other hand, rigidity of the water-soluble polymer may be increased and preservation stability of a lithium ion secondary battery may be reduced if the integer n is excessively small. In a situation in which a plurality of polyoxyalkylene structures ($-(C_mH_{2m}O)_n-$) are included in molecules of the multifunctional compound (C), it is preferable that an average value of the integer n for the plurality of polyoxyalkylene structures is within the aforementioned range, and it is more preferable that the integer n is within the aforementioned range for every one of the polyoxyalkylene structures.

The percentage content of the above-described multifunctional compound (C) among monomers contained in the monomer composition used in preparation of the water-soluble polymer is preferably at least 0.1 mass %, more preferably at least 0.3 mass %, and even more preferably at least 0.5 mass %, and is preferably no greater than 20.0 mass %, more preferably no greater than 10.0 mass %, and even more preferably no greater than 5.0 mass %. As a result of the percentage content of the multifunctional compound (C) among the monomers being at least 0.1 mass %, negative electrode expansion can be sufficiently suppressed and lithium ion secondary battery cycle characteristics can be further improved. On the other hand, by the percentage content of the multifunctional compound (C) among the monomers being no greater than 20.0 mass %, it is possible to prevent the water-soluble polymer from becoming excessively rigid, and thus becoming brittle, and as a result, it is possible to suppress reduction in lithium ion secondary battery preservation stability caused by gas production or the like.

—Compound (D)—

The monomer composition may include a compound (D) as a monomer, the compound (D) being composed of at least one selected from the group consisting of an ethylenically unsaturated sulfonic acid, an ethylenically unsaturated sulfonic acid salt, an ethylenically unsaturated phosphoric acid, and an ethylenically unsaturated phosphoric acid salt. By using such a compound (D) in polymerization of the water-soluble polymer, the close adherence between the negative electrode mixed material layer and the current collector can be increased, and the cycle characteristics and preservation stability can be improved. The reason is presumed to be that the ability of the water-soluble polymer to bind to a negative electrode active material increases through the contribution of the sulfonate group and/or the phosphate group, thereby allowing the water-soluble polymer to cover the negative electrode active material even better.

As the compound (D), at least one selected from the group consisting of an ethylenically unsaturated sulfonic acid, an ethylenically unsaturated phosphoric acid, an ethylenically unsaturated sulfonic acid salt, and an ethylenically unsaturated phosphoric acid salt may be used.

Examples of ethylenically unsaturated sulfonic acids that can be used include 2-acrylamide-2-methylpropane sulfonic acid, styrene sulfonic acid, and vinyl sulfonic acid. Examples of ethylenically unsaturated sulfonic acid salts that can be used include sodium salts, potassium salts, and lithium salts of ethylenically unsaturated sulfonic acids.

Examples of ethylenically unsaturated phosphoric acids that can be used include 2-(meth)acryloyloxyethyl phosphate, and examples of ethylenically unsaturated phosphoric acid salts that can be used include sodium salts, potassium salts, and lithium salts of ethylenically unsaturated phosphoric acids.

These examples of compound (D) may be used alone or in combination of two or more thereof in a freely selected ratio.

The term "(meth)acryloyl" as used in the present disclosure refers to "acryloyl and/or methacryloyl".

In the paste composition of the present disclosure, as the compound (D), an ethylenically unsaturated sulfonic acid salt and/or an ethylenically unsaturated phosphoric acid salt may be used, preferably a lithium salt of an ethylenically unsaturated sulfonic acid and/or a lithium salt of an ethylenically unsaturated phosphoric acid. By using an ethylenically unsaturated sulfonic acid salt and/or an ethylenically unsaturated phosphoric acid salt, the water-solubility of the resulting water-soluble polymer can be improved. Therefore, when preparing a water-soluble polymer using water as a polymerization solvent, polymerization can be prevented from progressing inhomogeneously due to precipitation of the water-soluble polymer, even if the monomer concentration in the monomer composition is high. Accordingly, polymerization can be caused to progress homogeneously while increasing producibility through use of a monomer composition that has a high monomer concentration. Also, using a lithium salt of an ethylenically unsaturated sulfonic acid and/or a lithium salt of an ethylenically unsaturated phosphoric acid introduces a lithium sulfonate group ($-SO_3Li$) and/or a lithium phosphate group ($-PO_4Li_2$, $-PO_4LiH$) into the resulting water-soluble polymer, improves the stability of the slurry composition obtained by using the paste composition, and can suppress swelling of the negative electrode of a lithium ion secondary battery while increasing the close adherence between the negative electrode mixed material layer and the current collector. Also, the cycle characteristics of the lithium ion secondary battery can be further improved, and the internal resistance can be reduced while enhancing the preservation stability.

In order to improve the close adherence between the current collector and the negative electrode mixed material layer produced using the paste composition of the present disclosure and to suppress swelling of the negative electrode, 2-acrylamide-2-methylpropane sulfonic acid, styrene sulfonic acid, vinyl sulfonic acid, 2-methacryloyloxyethyl phosphate (acid phosphoxyethyl methacrylate), or salts thereof are preferably used as the compound (D), with 2-acrylamide-2-methylpropane sulfonic acid and 2-acrylamide-2-methylpropane sulfonic acid salt being more preferable.

The percentage content of the compound (D) among monomers contained in the monomer composition used in preparation of the water-soluble polymer is preferably at least 0.4 mass %, more preferably at least 0.5 mass %, even more preferably at least 1.0 mass %, and particularly preferably at least 5.0 mass %, and is preferably no greater than 30.0 mass %, more preferably no greater than 20.0 mass %, and even more preferably no greater than 15.0 mass %. By setting the percentage content of the compound (D) among the monomers to at least 0.4 mass %, the close adherence between the negative electrode mixed material layer and the current collector can be ensured. Also, swelling of the negative electrode can be sufficiently suppressed, and the cycle characteristics can be further improved. On the other hand, by setting the percentage content of the compound (D) among the monomers to be no greater than 30.0 mass %, the slurry solid content concentration can be increased and producibility of the negative electrode can be heightened without an excessive rise in the viscosity of the paste composition and the slurry composition that include the water-soluble polymer. Since the slurry solid content concentration can be increased, migration of the water-soluble polymer due to thermal convection (uneven distribution on the surface of the negative electrode mixed material layer after completion of drying) can be suppressed when applying the slurry composition onto the current collector and drying, the close adherence between the negative electrode mixed material layer and the current collector can be increased, swelling of the negative electrode can be suppressed, and the cycle characteristics can be further improved.

When the monomer composition includes the compound (D), the value ((A+D)/B) obtained by dividing the sum of the percentage content of the ethylenically unsaturated carboxylic acid compound (A) among all monomers in the monomer composition and the percentage content of the compound (D) among all monomers in the monomer composition by the percentage content of the compound (B) among all monomers in the monomer composition is preferably less than 1.5, more preferably no greater than 1.2, and even more preferably no greater than 0.8, and is preferably at least 0.5.

If ((A+D)/B) is less than 1.5, the percentage content of salt in the monomers within the monomer composition can be suppressed, increasing the preservation stability of the lithium ion secondary battery. On the other hand, if ((A+D)/B) is at least 0.5, the water-soluble polymer can suitably cover the negative electrode active material, increasing the close adherence between the negative electrode mixed material layer and the current collector and suppressing swelling of the negative electrode.

—Other Compounds—

The monomer composition used in preparation of the water-soluble polymer may contain other known compounds that are copolymerizable with the above-described ethylenically unsaturated carboxylic acid compound (A), compound (B), multifunctional compound (C), and compound (D). In the monomers included in the water-soluble polymer and used to prepare the water-soluble polymer, the percentage content of the compounds other than (A) to (D)

is preferably no greater than 20 mass %, more preferably no greater than 10 mass %, and even more preferably less than 0.1 mass %.

Specific examples of other compounds that can be used include acrylic acid esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, nonyl acrylate, decyl acrylate, lauryl acrylate, n-tetradecyl acrylate, stearyl acrylate, perfluoroalkyl ethyl acrylates, and phenyl acrylate; methacrylic acid esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, nonyl methacrylate, decyl methacrylate, lauryl methacrylate, n-tetradecyl methacrylate, stearyl methacrylate, perfluoroalkyl ethyl methacrylates, and phenyl methacrylate; and other compounds such as vinyl acetate, glycidyl methacrylate, and 2-vinylpyridine.

—Additives—

Examples of additives that may be blended into the monomer composition used in preparation of the water-soluble polymer include known additives that can be used in a polymerization reaction. Specific examples include polymerization initiators such as potassium persulfate and polymerization accelerators such as tetramethylethylenediamine.

In order to neutralize the ethylenically unsaturated carboxylic acid, ethylenically unsaturated sulfonic acid, and ethylenically unsaturated phosphoric acid, which are included as monomers, and convert these acids to salts before polymerization, the monomer composition preferably includes a basic compound as an additive. By neutralizing these monomers and converting them to salts before polymerization, polymerization stability can be ensured, and a neutralization process after polymerization can be omitted, thereby simplifying the manufacturing process overall.

When using a monomer composition that includes at least one of an ethylenically unsaturated carboxylic acid, an ethylenically unsaturated sulfonic acid, and an ethylenically unsaturated phosphoric acid as a monomer, then at the time of the aforementioned neutralization, a basic lithium compound is preferably used as the basic compound. By using a basic lithium compound, the carboxyl group, sulfonate group, and phosphate group that are monomers included in the monomer composition respectively become a lithium carboxylate group (—COOLi), a lithium sulfonate group (—SO$_3$Li), and a lithium phosphate group (—PO$_4$Li$_2$, —PO$_4$LiH). The thixotropy and stability of the slurry composition that includes the water-soluble polymer obtained after polymerization are then further improved, and the internal resistance of the lithium ion secondary battery is decreased. Additionally, the cycle characteristics and the preservation stability are improved. The basic lithium compound may for example be lithium carbonate (Li$_2$CO$_3$) or lithium hydroxide (LiOH), and is preferably lithium hydroxide.

The type and blending amount of such additives may be freely selected depending on the polymerization method and so forth.

—Polymerization Solvent—

The polymerization solvent blended into the monomer composition used in preparation of the water-soluble polymer may be a known solvent in which the above-described monomers can be dissolved or dispersed, and may be selected in accordance with the polymerization method and so forth. Of such solvents, water is preferable as the polymerization solvent. Moreover, the polymerization solvent may be an aqueous solution of a freely selected compound or a mixed solution of water and a small amount of an organic medium.

[Preparation of Water-Soluble Polymer]

The water-soluble polymer can be obtained, for example, through radical polymerization of the monomer composition obtained by mixing the above-described monomers, additives, and polymerization solvent by a known method. The solution that is obtained through polymerization of the aforementioned monomer composition and contains the water-soluble polymer and the polymerization solvent may be used as-produced to prepare a paste composition, in particular when the polymerization solvent is water, or may be used to prepare a paste composition after undergoing solvent substitution, addition of optional components, or the like.

The polymerization method may be a commonly known polymerization method such as aqueous solution polymerization, slurry polymerization, suspension polymerization, or emulsion polymerization. However, aqueous solution polymerization using water as the polymerization solvent is preferable in that a solvent removal process is not required, solvent safety is high, and there are no issues related to mixing in of a surfactant. Aqueous solution polymerization is a method in which a monomer composition is adjusted to a predetermined concentration and sufficient purging of dissolved oxygen in the reaction system with an inert gas is performed prior to carrying out a polymerization reaction by adding a radical polymerization initiator and performing heating or light irradiation with ultraviolet light or the like as necessary.

When water is used as the polymerization solvent and the above-described monomer composition is polymerized in water to prepare an aqueous solution containing the water-soluble polymer, the pH of the aqueous solution is preferably adjusted to a pH of at least 8 and no greater than 9 after the polymerization. As a result of the resultant aqueous solution being neutralized through adjustment to a pH of 8-9, the slurry composition prepared using the paste composition can be provided with thixotropy, stability of the slurry composition can be increased, and preservation stability of a lithium ion secondary battery can be improved. For neutralization after polymerization, the basic compound described above in the section on "Additives" may be used, as when neutralizing before polymerization.

[Properties of Water-Soluble Polymer]

The degree of swelling in electrolysis solution of the water-soluble polymer prepared in the above-described way is required to be less than 120 mass %, is preferably less than 117%, more preferably less than 115 mass %, and even more preferably less than 110 mass %, and is preferably at least 100 mass %, more preferably at least 103 mass %, and even more preferably at least 105 mass %. If the degree of swelling in electrolysis solution is at least 120 mass %, the water-soluble polymer swells excessively in an electrolysis solution, so that the structure of an electrode plate cannot be preserved and cycle characteristics are reduced. On the other hand, lithium ion conductivity can be ensured and lithium ion secondary battery internal resistance can be reduced by the degree of swelling in electrolysis solution being at least 100 mass %. Additionally, the flexibility of the water-soluble polymer can be ensured, cracking and peeling of the water-soluble polymer can be inhibited, and preservation stability of a lithium ion secondary battery can be increased.

The degree of swelling in electrolysis solution of the water-soluble polymer can be measured by the method described in the Examples of the present specification.

Furthermore, the degree of swelling in electrolysis solution of the water-soluble polymer can be adjusted by changing the types and amounts of the ethylenically unsaturated carboxylic acid compound (A), the compound (B), and the compound (D) in the monomer composition.

<Negative Electrode Active Material>

The negative electrode active material is a substance that accepts and donates electrons in the negative electrode of a lithium ion secondary battery. As the negative electrode active material of a lithium ion secondary battery, a material that can store and emit lithium is normally used.

In the paste composition for lithium ion secondary battery negative electrode-use of the present disclosure, the negative electrode active material contains a silicon-based negative electrode active material in an amount of at least 30 mass %, preferably at least 50 mass %, more preferably at least 60 mass %, even more preferably at least 70 mass %, and particularly preferably at least 80 mass %. By mixing with the above-described water-soluble polymer in such a state in which the percentage content of the silicon-based negative electrode active material in the negative electrode active material is large, the silicon-based negative electrode active material that easily aggregates can suitably cover the water-soluble polymer, and the dispersibility of the silicon-based negative electrode active material can be increased.

In a negative electrode mixed material layer formed from the slurry composition prepared using the paste composition, in order to form a suitable conductive path between particles of the active material and to reduce internal resistance, another negative electrode active material is preferably used together with the silicon-based negative electrode active material at the stage of forming the paste composition. From this perspective, the upper limit on the percentage content of the silicon-based negative electrode active material in the negative electrode active material is preferably no greater than 95 mass %, more preferably no greater than 90 mass %, and even more preferably no greater than 85 mass %.

[Silicon-Based Negative Electrode Active Material]

Examples of the silicon-based negative electrode active material include silicon (Si), a silicon-containing alloy, SiO, $SiO_x$, and a composite material of conductive carbon and a Si-containing material obtained by coating or combining the Si-containing material with the conductive carbon. One of these silicon-based negative electrode active materials may be used individually, or two or more of these silicon-based negative electrode active materials may be used in combination.

The silicon-containing alloy may for example be an alloy composition that contains silicon and at least one element selected from the group consisting of titanium, iron, cobalt, nickel, and copper.

Alternatively, the silicon-containing alloy may for example be an alloy composition that contains silicon, aluminum, and transition metals such as iron, and further contains rare-earth elements such as tin and yttrium.

$SiO_x$ is a compound that contains Si and at least one of SiO and $SiO_2$, where x is usually at least 0.01 and less than 2. SiO can for example be formed by utilizing a disproportionation reaction of silicon monoxide (SiO). Specifically, $SiO_x$ can be prepared by heat-treating SiO, optionally in the presence of a polymer such as polyvinyl alcohol, to produce silicon and silicon dioxide. After SiO has been pulverized and mixed with the optional polymer, the heat treatment can be performed at a temperature of 900° C. or higher, and preferably 1000° C. or higher, in an atmosphere containing organic gas and/or vapor.

The composite of a Si-containing material and conductive carbon may be a compound obtained, for example, by heat-treating a pulverized mixture of SiO, a polymer such as polyvinyl alcohol, and optionally a carbon material in an atmosphere containing organic gas and/or vapor. Furthermore, a commonly known method can be used to obtain the aforementioned composite, such as a method of coating the surfaces of particles of SiO with organic gas or the like by chemical vapor deposition, or a method of forming composite particles (granulation) by a mechanochemical process using SiO particles and graphite or artificial graphite.

In order to increase lithium ion secondary battery capacity, a silicon-containing alloy and $SiO_x$ are preferable as the silicon-based negative electrode active material.

The volume-average particle diameter D50 of the silicon-based negative electrode active material may be any value and may be approximately at least 10 nm to no greater than 5 μm. The particle diameter of the silicon-based negative electrode active material is small as compared to a carbon-based negative electrode active material or the like, and such a small particle size is one reason why silicon-based negative electrode active material aggregates easily. According to the present disclosure, however, by the contribution of the above-described water-soluble polymer, the dispersibility of silicon-based negative electrode active material with such a small particle diameter can be sufficiently ensured.

The volume-average particle diameter D50 of the silicon-based negative electrode active material may be calculated as the particle diameter where the cumulative volume from the fine side amounts to 50% of the entire volume in a particle size distribution measured by dry measurement using a laser diffraction particle size analyzer.

[Other Negative Electrode Active Material]

Examples of a negative electrode active material used together with the aforementioned silicon-based negative electrode active material in the paste composition for lithium ion secondary battery negative electrode-use of the present disclosure include a carbon-based negative electrode active material and a metal-based negative electrode active material.

—Carbon-Based Negative Electrode Active Material—

The carbon-based negative electrode active material can be defined as an active material that contains carbon as its main framework and into which lithium can be inserted (also referred to as "doping"). Examples of the carbon-based negative electrode active material include carbonaceous materials and graphitic materials.

A carbonaceous material is a material with a low degree of graphitization (i.e., low crystallinity) that can be obtained by carbonizing a carbon precursor by heat treatment at 2000° C. or lower. The lower limit of the heat treatment temperature in the carbonization is not specifically limited and may for example be 500° C. or higher.

Examples of the carbonaceous material include graphitizing carbon whose carbon structure can easily be changed according to the heat treatment temperature and non-graphitizing carbon typified by glassy carbon, which has a structure similar to an amorphous structure.

The graphitizing carbon may be a carbon material made using tar pitch obtained from petroleum or coal as a raw material. Specific examples of graphitizing carbon include coke, mesocarbon microbeads (MCMB), mesophase pitch-based carbon fiber, and pyrolytic vapor-grown carbon fiber.

Examples of the non-graphitizing carbon include sintered phenolic resin, polyacrylonitrile-based carbon fiber, quasi-isotropic carbon, sintered furfuryl alcohol resin (PFA), and hard carbon.

The graphitic material is a material having high crystallinity of a similar level to graphite. The graphitic material can be obtained by heat-treating graphitizing carbon at 2000° C. or higher. The upper limit of the heat treatment temperature is not specifically limited and may for example be 5000° C. or lower.

Examples of the graphitic material include natural graphite and artificial graphite.

Examples of the artificial graphite include an artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

—Metal-Based Negative Electrode Active Material—

The metal-based negative electrode active material is an active material that contains metal, the structure of which usually contains an element that allows insertion of lithium, and that exhibits a theoretical electric capacity of 500 mAh/g or higher per unit mass when lithium is inserted. Examples of the metal-based negative electrode active material include lithium metal; a simple substance of metal, other than Si, that can form a lithium alloy (for example, Ag, Al, Ba, Bi, Cu, Ga, Ge, In, Ni, P, Pb, Sb, Sn, Sr, Zn, or Ti); alloys of the simple substance of metal; and oxides, sulfides, nitrides, carbides, and phosphides of lithium metal, the simple substance of metal, and the alloys of the simple substance of metal.

In order to increase the lithium ion secondary battery capacity sufficiently while suppressing expansion and contraction of the negative electrode active material, a carbon-based negative electrode active material is preferably used as the other negative electrode active material, with use of artificial graphite being more preferable. In other words, the negative electrode active material is preferably a mixture of the silicon-based negative electrode active material and a carbon-based negative electrode active material such as artificial graphite or the like.

<Blending Ratio of Water-Soluble Polymer and Silicon-Based Negative Electrode Active Material>

The lithium ion secondary battery paste composition of the present disclosure is required to include the water-soluble polymer in an amount, per 100 parts by mass of the silicon-based negative electrode active material, of at least 3 parts by mass and less than 500 parts by mass, preferably at least 8 parts by mass, more preferably at least 12 parts by mass, and particularly preferably at least 15 parts by mass, and preferably no greater than 250 parts by mass, more preferably no greater than 150 parts by mass, even more preferably no greater than 100 parts by mass, particularly preferably no greater than 50 parts by mass, and most preferably no greater than 35 parts by mass. If the blending amount of the water-soluble polymer is less than 3 parts by mass per 100 parts by mass of the silicon-based negative electrode active material, then the silicon-based negative electrode active material cannot be sufficiently covered by the water-soluble polymer, and the cycle characteristics of the lithium ion secondary battery are reduced. On the other hand, if the blending amount of the water-soluble polymer is at least 500 parts by mass per 100 parts by mass of the silicon-based negative electrode active material, then the amount of the water-soluble polymer, which is an insulator, becomes excessive, and the internal resistance of the lithium ion secondary battery rises.

<Preparation Method of Paste Composition for Lithium Ion Secondary Battery Negative Electrode-Use>

The paste composition for lithium ion secondary battery negative electrode-use can be prepared by dispersing and/or dissolving the above-described negative electrode active material and water-soluble polymer in an aqueous medium. Specifically, the paste composition can be prepared by mixing the negative electrode active material, water-soluble polymer, and aqueous medium using a mixer such as a ball mill, a sand mill, a bead mill, a pigment disperser, a grinding machine, an ultrasonic disperser, a homogenizer, a planetary mixer, or a FILMIX.

Although water is normally used as the aqueous medium, alternatively, an aqueous solution of a freely selected compound or a mixed solution of a small amount of an organic medium and water may be used.

Other than the negative electrode active material and the water-soluble polymer, the paste composition may also include the "particulate polymer" and "other components" described below in the section "Slurry composition for lithium ion secondary battery negative electrode-use".

The paste composition obtained in this way may be used as-prepared to prepare a slurry composition or may be used to prepare a slurry composition after being subjected to dry granulation to yield the below-described composite particles.

(Composite Particles for Lithium Ion Secondary Battery Negative Electrode-Use)

The composite particles for lithium ion secondary battery negative electrode-use of the present disclosure are obtained by subjecting the above-described paste composition for lithium ion secondary battery negative electrode-use of the present disclosure to dry granulation. In other words, the composite particles of the present disclosure are composed of dried granulated material of the aforementioned paste composition, normally contain the aforementioned negative electrode active material and the aforementioned water-soluble polymer, and may contain the aforementioned particulate polymer and the aforementioned other components. When the above-described water-soluble polymer and/or particulate polymer include a crosslinkable structural unit, then at the time that the paste composition is subjected to dry granulation, or at the time of heat treatment optionally performed after dry granulation, the water-soluble polymer and/or particulate polymer may be crosslinked (in other words, the composite particles may include a crosslinked product of the above-described water-soluble polymer and/or particulate polymer). The suitable ratio of the components included in the composite particles is the same as the suitable ratio of the components in the paste composition.

The composite particles of the present disclosure are yielded by subjecting the paste composition of the present disclosure to dry granulation. Therefore, by preparing a slurry composition using the composite particles of the present disclosure and then using the slurry composition to produce a negative electrode, a lithium ion secondary battery using the silicon-based negative electrode active material can be caused to have excellent cycle characteristics.

Additionally, by preparing a slurry composition using composite particles with low moisture content, the solid content concentration of the slurry composition can be increased, and the producibility of the negative electrode can be improved.

<Method of Dry Granulation>

The method of dry granulation when obtaining composite particles by subjecting the paste composition to dry granulation is not specifically limited. Examples of the method of dry granulation include spray granulation, fluidized bed granulation, tumbling layer granulation, compression-type granulation, stirring-type granulation, extrusion granulation, crushing-type granulation, fluidized bed multi-functional granulation, and melt granulation. Among these, spray granulation is preferable for good drying efficiency.

Specifically, during formation of the composite particles using spray granulation, the aforementioned paste composition is sprayed using a spray dryer, thereby drying droplets of the sprayed paste composition inside a drying tower. As a result, composite particles that include the negative electrode active material and water-soluble polymer included in the droplets can be obtained. The temperature of the sprayed paste composition is normally room temperature, but the paste composition may be heated to a higher temperature than room temperature. The hot air temperature at the time of spray drying is normally 80° C. to 250° C. and is preferably 100° C. to 200° C.

Furthermore, during spray granulation, the resulting composite particles may be subjected to tumbling granulation, or the resulting composite particles may be subjected to heat treatment. Methods of tumbling granulation for example include the rotating pan method, rotating drum method, and rotating truncated cone method disclosed in JP 2008-251965 A. In order sufficiently to remove solvent, such as water, the temperature when tumbling the composite particles is normally at least 80° C. and preferably at least 100° C., and is normally no greater than 300° C. and preferably no greater than 200° C. The heat treatment is performed in order to harden the surface of the composite particles, and the heat treatment temperature is normally from 80° C. to 300° C.

<Properties of Composite Particles>

The volume-average particle diameter D50 of the composite particles prepared in the above-described way is preferably at least 10 μm, more preferably at least 20 μm, and even more preferably at least 30 μm, and is preferably no greater than 100 μm, more preferably no greater than 80 μm, even more preferably no greater than 60 μm, and particularly preferably no greater than 40 μm. When preparing a slurry composition using the composite particles, it becomes easier for composite particles in which silicon-based negative electrode active material is covered by water-soluble polymer to separate if the volume-average particle diameter D50 of the composite particles is within the above-described ranges. As a result, the composite particles and hence the silicon-based negative electrode active material can be suitably dispersed in the slurry composition.

The volume-average particle diameter D50 of the composite particles can be measured using the same measurement method as for the volume-average particle diameter D50 of the silicon-based negative electrode active material.

(Slurry Composition for Lithium Ion Secondary Battery Negative Electrode-Use)

The slurry composition for lithium ion secondary battery negative electrode-use of the present disclosure is prepared using the above-described paste composition for lithium ion secondary battery negative electrode-use and/or composite particles for lithium ion secondary battery negative electrode-use of the present disclosure. When the slurry composition of the present disclosure is used to produce a negative electrode, a lithium ion secondary battery that uses the silicon-based negative electrode active material can be provided with excellent cycle characteristics.

The slurry composition of the present disclosure is prepared by, for example, mixing together the paste composition and/or composite particles, a negative electrode active material, and as necessary, an aqueous medium, a particulate polymer, a water-soluble polymer, and other components (a thickener and the like).

<Negative Electrode Active Material>

When preparing the slurry composition, a negative electrode active material may be newly added in addition to the negative electrode active material in the paste composition and/or the composite particles. The newly added negative electrode active material is not specifically limited, but in order to increase the capacity of a lithium ion secondary battery sufficiently while suppressing expansion and contraction of the negative electrode active material, a negative electrode active material other than the silicon-based negative electrode active material is preferable, with a carbon-based negative electrode active material being more preferable.

<Particulate Polymer>

The particulate polymer is a water-insoluble polymer and is normally present in the form of particles in an aqueous slurry composition that contains water as a dispersion medium. When preparing the slurry composition, if a particulate polymer is added as a separate binding material, the composite particles in which silicon-based negative electrode active material is covered by water-soluble polymer can easily be bound throughout the negative electrode mixed material layer while maintaining the covered state, and the cycle characteristics and preservation stability of the lithium ion secondary battery can be further improved.

Also, the above-described particulate polymer is not specifically limited, but examples include diene-based polymers such as a styrene-butadiene copolymer, a styrene butadiene acrylonitrile copolymer, and a butadiene-acrylonitrile copolymer; an acrylic polymer; a fluoropolymer; a silicone polymer; and the like. Among these, a styrene-butadiene copolymer is preferable in order to improve the cycle characteristics and the preservation stability of the lithium ion secondary battery.

Also, for the stability of the particles, well-known treatment may be applied to these particulate polymers, such as addition of an acid compound. The shape of the particulate polymer is not specifically limited, as long as the polymer is particulate. Examples include a core-shell shape, an irregular shape, and a hollow shape. In order to endow the particulate polymer for example with a core-shell shape, an irregular shape, or a hollow shape, it is effective to adopt a power feed polymerization method that gradually changes the material composition as the preparation method of the particulate polymer.

Note that these particulate polymers may be used alone or in combination of two or more thereof in a freely selected ratio.

<Water-Soluble Polymer>

When preparing the slurry composition, a water-soluble polymer may be newly added in addition to the negative electrode active material in the paste composition and/or the composite particles, thereby increasing the close adherence between particles of the negative electrode active material (in particular the silicon-based negative electrode active material) and suppressing expansion and contraction of the negative electrode active material. The cycle characteristics of the lithium ion secondary battery can thus be further improved.

<Other Components>

Besides the components described above, the slurry composition of the present disclosure may optionally contain other known components that can be contained in a slurry composition. One example of such a known component is a thickener. The slurry composition may contain, as the thickener, a natural thickener such as carboxymethyl cellulose, a polysaccharide thickener, alginic acid, or starch; or a synthetic thickener such as polyvinyl alcohol, polyvinyl pyrrolidone, polyacrylic acid, or the like (excluding substances that correspond to the above-described water-soluble polymer). Of these thickeners, carboxymethyl cellulose and polyacrylic acid are preferable from a viewpoint of providing a slurry composition with thixotropy and increasing stability of the slurry composition.

The slurry composition of the present disclosure may contain a fibrous additive, such as carbon nanotubes or cellulose nanofibers, in order to strengthen the negative electrode structure and suppress expansion and contraction of the silicon-based negative electrode active material, and also to ensure conductivity between the negative electrode active materials.

<Preparation Method of Slurry Composition for Lithium Ion Secondary Battery Negative Electrode-Use>

The slurry composition for lithium ion secondary battery negative electrode-use may, for example, be prepared by using the mixer described above in the section "Preparation method of paste composition for lithium ion secondary battery negative electrode-use" to mix the paste composition and/or composite particles of the present disclosure with negative electrode active material, optionally along with a particulate polymer, water-soluble polymer, other components, and an aqueous medium.

The percentage content of each of the aforementioned components in the slurry composition can be adjusted as appropriate.

In order to improve the stability of the slurry composition and the producibility of the negative electrode while guaranteeing the performance of the lithium ion secondary battery, the content of the water-soluble polymer in the slurry composition is preferably at least 0.5 parts by mass and no greater than 10 parts by mass per 100 parts by mass of the negative electrode active material.

When the slurry composition contains the particulate polymer, the content of the particulate polymer in the slurry composition per 100 parts by mass of the negative electrode active material is preferably at least 0.05 parts by mass, more preferably at least 0.1 parts by mass, even more preferably at least 0.2 parts by mass, and particularly preferably at least 0.6 parts by mass, and is preferably no greater than 3.0 parts by mass, more preferably no greater than 2.0 parts by mass, and even more preferably no greater than 1.7 parts by mass. If the blending amount of the particulate polymer is at least 0.05 parts by mass per 100 parts by mass of the negative electrode active material, the close adherence between the negative electrode mixed material layer and the current collector can be increased, and the cycle characteristics of the lithium ion secondary battery can be further improved. On the other hand, as a result of the blending amount of the particulate polymer being no greater than 3.0 parts by mass, it is possible to avoid a situation in which production of the slurry composition becomes difficult due to excessively high viscosity or in which internal resistance increases excessively.

In a situation in which the slurry composition contains a thickener, the content of the thickener in the slurry composition per 100 parts by mass of the negative electrode active material is preferably at least 0.1 parts by mass and no greater than 5 parts by mass. As a result of the blending amount of the thickener being in the aforementioned range, it is possible to ensure thixotropy and stability of the slurry composition.

(Negative Electrode for Lithium Ion Secondary Battery-Use)

The negative electrode for lithium ion secondary battery-use of the present disclosure includes a negative electrode mixed material layer that is obtained using the slurry composition of the present disclosure. In greater detail, the negative electrode for lithium ion secondary battery-use of the present disclosure is provided with a current collector and a negative electrode mixed material layer formed on the current collector. The negative electrode mixed material layer is normally a dried product of the aforementioned slurry composition. At least a negative electrode active material and a water-soluble polymer are included in the negative electrode mixed material layer. When the above-described water-soluble polymer and/or particulate polymer include a crosslinkable structural unit, then at the time of drying of the slurry composition, or at the time of heat treatment optionally performed after drying, the water-soluble polymer and/or particulate polymer may be cross-linked (in other words, the negative electrode mixed material layer may include a crosslinked product of the above-described water-soluble polymer and/or particulate polymer). Components contained in the negative electrode mixed material layer are components that were contained in the aforementioned slurry composition for lithium ion secondary battery negative electrode-use. Furthermore, the suitable ratio of these components is the same as the suitable ratio of these components in the slurry composition.

The aforementioned negative electrode for lithium ion secondary battery-use is prepared using the slurry composition for lithium ion secondary battery negative electrode-use of the present disclosure. Therefore, the cycle characteristics of a lithium ion secondary battery using a silicon-based negative electrode active material can be improved.

<Production of Negative Electrode for Lithium Ion Secondary Battery-Use>

The aforementioned negative electrode for lithium ion secondary battery-use of the present disclosure may, for example, be produced through the steps of applying the above-described slurry composition for lithium ion secondary battery negative electrode-use onto a current collector (application step) and drying the slurry composition for lithium ion secondary battery negative electrode-use applied onto the current collector to form an electrode mixed material layer on the current collector (drying step).

[Application Step]

The aforementioned slurry composition for lithium ion secondary battery negative electrode-use may be applied onto the current collector with any commonly known method. Specific examples of application methods that can be used include doctor blading, dip coating, reverse roll coating, direct roll coating, gravure coating, extrusion coating, and brush coating. The slurry composition may be applied onto one side or both sides of the current collector. The thickness of the slurry coating applied onto the current collector before drying may be appropriately determined in accordance with the thickness of the negative electrode mixed material layer to be obtained after drying.

The current collector onto which the slurry composition is applied is a material having electrical conductivity and electrochemical durability. Specifically, the current collector may for example be made of iron, copper, aluminum, nickel, stainless steel, titanium, tantalum, gold, or platinum. Of these materials, copper foil is particularly preferable as a current collector used for a negative electrode. One of the aforementioned materials may be used individually, or two or more of the aforementioned materials may be used in combination in a freely selected ratio.

[Drying Step]

The slurry composition that has been applied onto the current collector may be dried by any commonly known method without any specific limitations. Examples of drying methods that can be used include drying by warm, hot, or low-humidity air; drying in a vacuum; and drying by irradiation with infrared light, electron beams, or the like. Drying the slurry composition on the current collector forms an electrode mixed material layer on the current collector, thus yielding a negative electrode for lithium ion secondary battery-use that includes the current collector and the negative electrode mixed material layer.

After the drying step, the negative electrode mixed material layer may be further subjected to a pressure treatment by mold pressing, roll pressing, or the like. The pressure treatment may improve the adherence between the negative electrode mixed material layer and the current collector.

Furthermore, when the negative electrode mixed material layer includes a curable polymer, the polymer is preferably cured after forming the negative electrode mixed material layer.

(Lithium Ion Secondary Battery)

The lithium ion secondary battery of the present disclosure includes a positive electrode, a negative electrode, an electrolysis solution, and a separator. The negative electrode for lithium ion secondary battery-use of the present disclosure is used as the negative electrode. As a result of using the negative electrode for lithium ion secondary battery-use of the present disclosure, the aforementioned lithium ion secondary battery has high battery capacity and excellent cycle characteristics.

<Positive Electrode>

The positive electrode of the aforementioned lithium ion secondary battery may be any known positive electrode that is used as the positive electrode of a lithium ion secondary battery. Specifically, the positive electrode that is used may for example be a positive electrode obtained by forming a positive electrode mixed material layer on a current collector.

The current collector may be made of a metal material such as aluminum. The positive electrode mixed material layer may be a layer containing a known positive electrode active material, conductive material, and binding material.

<Electrolysis Solution>

The electrolysis solution may be formed by dissolving an electrolyte in a solvent.

The solvent may be an organic solvent that can dissolve an electrolyte.

Specifically, the solvent may be an alkyl carbonate solvent to which a viscosity modification solvent is added. Examples of the alkyl carbonate solvent include ethylene carbonate, propylene carbonate, and γ-butyrolactone. Examples of the viscosity modification solvent include 2,5-dimethyltetrahydrofuran, tetrahydrofuran, diethyl carbonate, ethyl methyl carbonate, dimethyl carbonate, methyl acetate, dimethoxyethane, dioxolane, methyl propionate, and methyl formate.

The electrolyte may be a lithium salt. Examples of the lithium salt include lithium salts described in JP 2012-204303 A. Of these lithium salts, $LiPF_6$, $LiClO_4$, and $CF_3SO_3Li$ are preferred as electrolytes because they readily dissolve in organic solvents and exhibit a high degree of dissociation.

<Separator>

Examples of the separator include separators described in JP 2012-204303 A. Of these separators, a fine porous membrane made of polyolefinic resin (polyethylene, polypropylene, polybutene, or polyvinyl chloride) is preferred since such a membrane can reduce the total thickness of the separator, which increases the ratio of the electrode active material in the lithium ion secondary battery, and consequently increases the capacity per unit volume.

<Production Method of Lithium Ion Secondary Battery>

The lithium ion secondary battery may be produced, for example, by stacking the positive electrode and the negative electrode with the separator in-between, rolling or folding the resultant stack as necessary in accordance with the battery shape to place the stack in a battery container, filling the battery container with the electrolysis solution, and sealing the battery container. In order to prevent pressure increase inside the lithium ion secondary battery and occurrence of overcharging or overdischarging, an overcurrent preventing device such as a PTC device or a fuse; an expanded metal; or a lead plate may be provided as necessary. The shape of the lithium ion secondary battery may for example be a coin type, button type, sheet type, cylinder type, prismatic type, or flat type.

EXAMPLES

The following provides a more specific description of the present disclosure based on examples. However, the present disclosure is not limited to the following examples. In the following, "%" and "parts" used to express quantities are by mass, unless otherwise specified.

For the Examples and the Comparative Examples, evaluations were performed by the following methods in order to evaluate the degree of swelling in electrolysis solution of the water-soluble polymer, the glass-transition temperature and gel content of the particulate polymer, the producibility of the negative electrode, the close adherence between the negative electrode mixed material layer and the current collector, and the rate characteristics, cycle characteristics, and preservation stability of the lithium ion secondary battery.

<Degree of Swelling in Electrolysis Solution>

An aqueous solution containing the water-soluble polymer was used to form a film with a thickness of 1±0.3 mm by drying in an environment of 50% humidity and a temperature of from 23° C. to 25° C. The resultant film was dried for 10 hours in a vacuum dryer at a temperature of 60° C. and approximately 1 g of the dried film was cut out and precisely weighed. The mass of a film piece obtained by this cutting was taken to be W0. The film piece was immersed in an electrolysis solution (composition: $LiPF_6$ solution of 1.0 M in concentration (mixed solvent of 3/7 (volume ratio) ethylene carbonate (EC)/ethyl methyl carbonate (EMC) used as solvent; 2 volume % (solvent ratio) of vinylene carbonate used as additive)) for 3 days at an ambient temperature of 60° C. and was allowed to swell. Thereafter, the film piece was pulled out of the electrolysis solution and the mass thereof was measured after electrolysis solution on the surface of the film piece had been wiped off using a KimWipe. The mass of the swollen film piece was taken to be W1.

The degree of swelling in electrolysis solution was calculated using the following calculation formula.

Degree of swelling in electrolysis solution (mass %)=$W1/W0\times100$

<Glass-Transition Temperature>

An aqueous dispersion containing the particulate polymer was used to form a film of 1±0.3 mm in thickness by drying for 3 days in an environment of 50% humidity and a temperature of from 23° C. to 26° C. The resultant film was dried for 10 hours in a vacuum dryer at a temperature of 60° C. The dried film was used as a measurement sample in order to measure the glass-transition temperature Tg (° C.) in accordance with JIS K7121, under conditions of a measurement temperature of from −100° C. to 180° C. and a heating rate of 5° C./minute, using a differential scanning calorimeter (DSC 6220 produced by SIT NanoTechnology Inc.).

<Gel Content>

An aqueous dispersion containing the particulate polymer was used to form a film with a thickness of 1±0.3 mm by drying in an environment of 50% humidity and a temperature of from 23° C. to 25° C. The resultant film was dried for 10 hours in a vacuum dryer at a temperature of 60° C. Thereafter, the dried film was cut to a square piece of from 3 mm to 5 mm in length and the mass of the film piece, which was approximately 1 g, was precisely weighed. The mass of the film piece obtained by this cutting was taken to be w0. The film piece was immersed in 50 g of tetrahydrofuran (THF) for 24 hours. Thereafter, the film piece was pulled out of the THF, was vacuum dried for 3 hours at a temperature of 105° C., and the mass w1 of insoluble content was measured.

The gel content was calculated according to the following calculation formula.

Gel content (mass %)=(w1/w0)×100

<Producibility of Negative Electrode>

The solid content concentration of a slurry composition that had been prepared to a viscosity of 2000±100 mPa×s (measured by a B-type viscometer at 12 rpm) was evaluated based on the following criteria. A higher solid content concentration for the slurry composition indicates that the slurry composition can be dried more easily, and thus indicates better producibility.

A: Solid content concentration of at least 45 mass %
B: Solid content concentration of at least 35 mass % and less than 45 mass %
C: Solid content concentration of at least 25 mass % and less than 35 mass %
D: Solid content concentration of less than 25 mass %

<Close Adherence Between Negative Electrode Mixed Material Layer and Current Collector>

A test piece having a rectangular shape of 100 mm in length and 10 mm in width was cut out from a produced negative electrode for lithium ion secondary battery-use. Cellophane tape (tape prescribed by JIS Z1522) was attached to the surface of the negative electrode mixed material layer with the surface on which the negative electrode mixed material layer was formed facing downward. Thereafter, one end of the current collector was pulled vertically at a pulling rate of 50 mm/minute to peel off the current collector while measuring stress during the peeling (note that the cellophane tape was fixed to a test bed). This measurement was performed 3 times to obtain an average value. The average value was taken to be the peel strength and was evaluated based on the following criteria. A larger value for the peel strength indicates better close adherence between the negative electrode mixed material layer and the current collector.

A: Peel strength of at least 5.0 N/m
B: Peel strength of at least 3.0 N/m and less than 5.0 N/m
C: Peel strength of at least 2.0 N/m and less than 3.0 N/m
D: Peel strength of less than 2.0 N/m <Rate Characteristics of Lithium Ion Secondary Battery>

A produced lithium ion secondary battery was left for 5 hours at a temperature of 25° C. after being filled with an electrolysis solution. Next, the lithium ion secondary battery was charged to a cell voltage of 3.65 V by a 0.2 C constant-current method at a temperature of 25° C., and was then subjected to aging treatment for 12 hours at a temperature of 60° C. The lithium ion secondary battery was subsequently discharged to a cell voltage of 2.75 V by a 0.2 C constant-current method at a temperature of 25° C. Thereafter, CC-CV charging of the lithium ion secondary battery was performed with a 0.2 C constant current (upper limit cell voltage 4.30 V) and CC discharging of the lithium ion secondary battery was performed to 3.00 V with a 0.2 C constant current.

Next, the lithium ion secondary battery was charged and discharged between 4.30 V and 2.75 V with a 0.2 C constant current at an ambient temperature of 25° C. The discharge capacity in this operation was taken to be C0. Thereafter, CC-CV charging of the lithium ion secondary battery with a 0.2 C constant current and discharging with a 1.0 C constant current were similarly performed. The discharge capacity in this operation was taken to be C1. A capacity change rate represented by $\Delta C=(C1/C0)\times 100(\%)$ was obtained as a rate characteristic and was evaluated based on the following criteria. A larger value for the capacity change rate $\Delta C$ indicates higher discharge capacity at high currents and lower internal resistance.

A: $\Delta C$ of at least 85%
B: $\Delta C$ of at least 75% and less than 85%
C: $\Delta C$ of at least 65% and less than 75%
D: $\Delta C$ of less than 65%

<Cycle Characteristics of Lithium Ion Secondary Battery>

A produced lithium ion secondary battery was left for 5 hours at a temperature of 25° C. after being filled with an electrolysis solution. Next, the lithium ion secondary battery was charged to a cell voltage of 3.65 V by a 0.2 C constant-current method at a temperature of 25° C., and was then subjected to aging treatment for 12 hours at a temperature of 60° C. The lithium ion secondary battery was subsequently discharged to a cell voltage of 2.75 V by a 0.2 C constant-current method at a temperature of 25° C. Thereafter, CC-CV charging of the lithium ion secondary battery was performed by a 0.2 C constant-current method (upper limit cell voltage 4.30 V) and CC discharging of the lithium ion secondary battery was performed to 2.75 V by a 0.2 C constant-current method.

The lithium ion secondary battery was subsequently discharged to a cell voltage of 2.75 V by a 0.1 C constant-current method at an ambient temperature of 25° C. Subsequently, at an ambient temperature of 45° C., a 50-cycle charge/discharge operation was performed at a charge/discharge rate of 0.5 C at 4.30 V. In this operation, the capacity of the first cycle, or specifically an initial discharge capacity "X1", and the discharge capacity of the $50^{th}$ cycle "X2" were measured, and a capacity change rate given by $\Delta C'=(X2/X1)\times 100(\%)$ was determined and rated based on the criteria below. A larger value for the capacity change rate $\Delta C'$ indicates better cycle characteristics.

A: $\Delta C'$ of at least 85%
B: $\Delta C'$ of at least 80% and less than 85%
C: $\Delta C'$ of at least 75% and less than 80%
D: $\Delta C'$ of less than 75%

<Preservation Stability of Lithium Ion Secondary Battery>

A produced lithium ion secondary battery was left for 5 hours at a temperature of 25° C. after being filled with an electrolysis solution. Next, the lithium ion secondary battery was charged to a cell voltage of 3.65 V by a 0.2 C constant-current method at a temperature of 25° C., and was then subjected to aging treatment for 12 hours at a temperature of 60° C. The lithium ion secondary battery was subsequently discharged to a cell voltage of 2.75 V by a 0.2 C constant-current method at a temperature of 25° C. Thereafter, CC-CV charging of the lithium ion secondary battery was performed by a 0.2 C constant-current method (upper limit cell voltage 4.30 V) and CC discharging of the lithium ion secondary battery was performed to a cell voltage of 2.75 V by a 0.2 C constant-current method.

Next, a cell volume (V0) of the lithium ion secondary battery was calculated by the Archimedean method. The lithium ion secondary battery was subsequently charged to a cell voltage of 4.40 V by a 0.2 C constant-current method at a temperature of 25° C. and was then left for 4 days at a temperature of 80±2° C. Thereafter, the lithium ion secondary battery was discharged to a cell voltage of 2.75 V by a 0.2 C constant-current method at a temperature of 25° C. Next, a cell volume (V1) of the lithium ion secondary battery was measured and an amount of gas production was calculated according to the calculation formula shown below. The calculated amount of gas production was evaluated based on the following criteria. A smaller amount of gas production indicates better preservation stability.

Amount of gas production (mL)=$V1$ (mL)−$V0$ (mL)

A: Amount of gas production of less than 4 mL
B: Amount of gas production of at least 4 mL and less than 5 mL
C: Amount of gas production of at least 5 mL and less than 6 mL
D: Amount of gas production of at least 6 mL
<Preparation of Aqueous Solution of Water-Soluble Polymer>

Production Example 1

A 1 L flask equipped with a septum was charged with 720 g of deionized water. The deionized water was heated to a temperature of 40° C., and the inside of the flask was purged with nitrogen gas at a flow rate of 100 mL/minute. Next, 10 g of deionized water, 9.5 g (25.0%) of acrylic acid as the ethylenically unsaturated carboxylic acid compound (A), and 28.5 g (75.0%) of acrylamide as the compound (B) were mixed and were injected into the flask using a syringe. Thereafter, 8.0 g of a 2.5% potassium persulfate aqueous solution was added to the flask as a polymerization initiator using a syringe. After 15 minutes had passed, 40 g of a 2.0% tetramethylethylenediamine aqueous solution was added as a polymerization accelerator using a syringe. After 4 hours had passed, a further 4.0 g of the 2.5% potassium persulfate aqueous solution was added to the flask as a polymerization initiator and a further 20 g of the 2.0% tetramethylethylenediamine aqueous solution was added as a polymerization accelerator. Heating was performed to a temperature of 60° C. in order to promote a polymerization reaction. After 3 hours had passed, the flask was opened to air to terminate the polymerization reaction, and the product was deodorized at a temperature of 80° C. to remove residual monomers.

The product was subsequently adjusted to a pH of 8 using a 10% lithium hydroxide aqueous solution to yield an aqueous solution containing the water-soluble polymer. The degree of swelling in electrolysis solution of the water-soluble polymer was then measured. The results are shown in Table 1.

Production Examples 2-8

A water-soluble polymer was prepared in the same way as in Production Example 1, with the exception that the monomers shown in Table 1 were used at the percentage contents shown in Table 1. The degree of swelling in electrolysis solution of the water-soluble polymer was then measured. The results are shown in Table 1. Note that in Production Examples 4 and 5, in addition to the monomers used in Production Example 1, polyethylene glycol diacrylate (Light Acrylate 9EG-A produced by Kyoeisha Chemical Co., Ltd.; equivalent to compound (I) for which n=9; functionality=2) was used as the multifunctional compound (C). In Production Examples 6 and 7, methyl methacrylate was used as another compound in addition to the monomers used in Production Example 1. Also, in Production Example 8, dimethacrylamide was used instead of the acrylamide used as the compound (B) in Production Example 1.

Production Example 9

A 1 L flask equipped with a septum was charged with 720 g of deionized water. The deionized water was heated to a temperature of 40° C., and the inside of the flask was purged with nitrogen gas at a flow rate of 100 mL/minute. Next, 10 g of deionized water, 9.5 g (25.0%) of acrylic acid as the ethylenically unsaturated carboxylic acid compound (A), 24.3 g (64.0%) of acrylamide as the compound (B), 0.38 g (1.0%) of polytetramethylene glycol diacrylate (produced by Kyoeisha Chemical Co., Ltd.; equivalent to compound (II) for which n=3; functionality=2) as the compound (C), 3.8 g (10.0%) of 2-acrylamide-2-methylpropane sulfonic acid as the compound (D), and 28.4 g of a 10% lithium hydroxide aqueous solution were mixed and were injected into the flask using a syringe. Thereafter, 8.0 g of a 2.5% potassium persulfate aqueous solution was added to the flask as a polymerization initiator using a syringe. After 15 minutes had passed, 40 g of a 2.0% tetramethylethylenediamine aqueous solution was added as a polymerization accelerator using a syringe. After 4 hours had passed, a further 4.0 g of the 2.5% potassium persulfate aqueous solution was added to the flask as a polymerization initiator and a further 20 g of the 2.0% tetramethylethylenediamine aqueous solution was added as a polymerization accelerator. Heating was performed to a temperature of 60° C. in order to promote a polymerization reaction. After 3 hours had passed, the flask was opened to air to terminate the polymerization reaction, and the product was deodorized at a temperature of 80° C. to remove residual monomers. The product was subsequently neutralized using a 10% lithium hydroxide aqueous solution to yield an aqueous solution containing the water-soluble polymer (pH=8). The degree of swelling in electrolysis solution of the water-soluble polymer was then measured. The results are shown in Table 1.

Production Example 10

A water-soluble polymer was prepared in the same way as in Production Example 1, with the exception that the monomers shown in Table 1 were used at the percentage contents shown in Table 1. The degree of swelling in electrolysis solution of the water-soluble polymer was then measured. The results are shown in Table 1.

<Preparation of Aqueous Dispersion of Particulate Polymer>
[Particulate Polymer Composed of Styrene-Butadiene Copolymer (SBR)]

A 5 MPa pressure vessel equipped with a stirrer was charged with 65 parts of styrene, 35 parts of 1,3-butadiene, 2 parts of itaconic acid, 1 part of 2-hydroxyethyl acrylate, 0.3 parts of t-dodecyl mercaptan as a molecular weight modifier, 5 parts of sodium dodecylbenzenesulfonate as an emulsifier, 150 parts of deionized water as a solvent, and 1 part of potassium persulfate as a polymerization initiator. The contents of the pressure vessel were sufficiently stirred and were then heated to a temperature of 55° C. to initiate polymerization.

Cooling was performed in order to terminate the reaction once the amount of monomer consumption had reached 95.0%. The aqueous dispersion containing the resultant polymer was adjusted to a pH of 8 through addition of a 5% sodium hydroxide aqueous solution. Thereafter, unreacted monomers were removed by distillation under heating and reduced pressure. Cooling was then performed to a temperature of 30° C. or lower to yield an aqueous dispersion containing a particulate polymer composed of a styrene-butadiene copolymer. The styrene-butadiene copolymer had a gel content of 92 mass % and a glass-transition temperature (Tg) of 10° C.

[Particulate Polymer Composed of Styrene Butadiene Acrylonitrile Copolymer (ABS)]

A 5 MPa pressure vessel equipped with a stirrer was charged with 35 parts of acrylonitrile, 65 parts of 1,3-butadiene, 0.3 parts of t-dodecyl mercaptan as a molecular weight modifier, 5 parts of sodium dodecylbenzenesulfonate as an emulsifier, 150 parts of deionized water as a solvent, and 1 part of potassium persulfate as a polymerization initiator. The contents of the pressure vessel were sufficiently stirred and were then heated to a temperature of 55° C. to initiate polymerization of the polymer that was to become the core portion.

Once the amount of monomer consumption had reached 80.0%, the pressure vessel was further charged with an aqueous dispersion that had been prepared in advance by mixing 27 parts of styrene, 15 parts of 1,3-butadiene, 16 parts of acrylonitrile, 1 part of acrylic acid, 2 parts of itaconic acid, 0.3 parts of t-dodecyl mercaptan as a molecular weight modifier, 5 parts of sodium dodecylbenzenesulfonate as an emulsifier, 150 parts of deionized water as a solvent, and 1 part of potassium persulfate as a polymerization initiator. The polymer that was to become the shell portion was then polymerized, and the mixture was cooled to stop the reaction once the consumed amount of all injected monomers reached 95.0%. The aqueous dispersion containing the resultant polymer was adjusted to a pH of 8 through addition of a 5% sodium hydroxide aqueous solution. Thereafter, unreacted monomers were removed by distillation under heating and reduced pressure. Cooling was then performed to a temperature of 30° C. or lower to yield an aqueous dispersion containing a particulate polymer composed of a styrene butadiene acrylonitrile copolymer. The styrene butadiene acrylonitrile copolymer had a gel content of 75 mass %, a glass-transition temperature (Tg) of the core portion of −37° C., and a glass-transition temperature (Tg) of the shell portion of 35° C.

[Particulate Polymer Composed of Acrylic Polymer (ACR)]

A 5 MPa pressure vessel equipped with a stirrer was charged with 82 parts of butyl acrylate, 2 parts of acrylonitrile, 2 parts of methacrylic acid, 1 part of N-methylolacrylamide, 1 part of allyl glycidyl ether, 4 parts of sodium lauryl sulfate as an emulsifier, 150 parts of deionized water as a solvent, and 0.5 parts of ammonium persulfate as a polymerization initiator. The contents of the pressure vessel were sufficiently stirred and were then heated to a temperature of 80° C. to initiate polymerization.

Cooling was performed in order to terminate the reaction once the amount of monomer consumption had reached 96.0%. The aqueous dispersion containing the resultant acrylic polymer was adjusted to a pH of 7 through addition of a 5% sodium hydroxide aqueous solution. Thereafter, unreacted monomers were removed by distillation under heating and reduced pressure. Cooling was then performed to a temperature of 30° C. or lower to yield an aqueous dispersion containing a particulate polymer composed of the acrylic polymer. The acrylic polymer had a gel content of 90 mass % and a glass-transition temperature (Tg) of −50° C.

<Preparation of Paste Composition for Lithium Ion Secondary Battery Negative Electrode-Use>

The paste composition for lithium ion secondary battery negative electrode-use was prepared by blending 20 parts of $SiO_x$ (theoretical capacity: 2400 mAh/g, volume-average particle diameter D50: 5 μm; the same holds below) as a silicon-based negative electrode active material, 5 parts of artificial graphite (theoretical capacity: 360 mAh/g, volume-average particle diameter D50: 23 μm; the same holds below) as a carbon-based negative electrode active material, and 3.0 parts by solid content equivalents of the 4.5% aqueous solution of the water-soluble polymer of Production Example 1 and mixing the result for 30 minutes in a bead mill.

<Preparation of Slurry Composition for Lithium Ion Secondary Battery Negative Electrode-Use>

To the paste composition obtained as described above, 75 parts of artificial graphite as a carbon-based negative electrode active material and 1.0 parts by solid content equivalents of a 4.5% aqueous solution of the water-soluble polymer were further added and were mixed at 30 rpm for 30 minutes in a planetary mixer equipped with a disper blade. Subsequently, 0.5 parts by solid content equivalents of an aqueous dispersion of SBR was added as a particulate polymer. The result was then mixed at 20 rpm for 15 minutes to yield a slurry in the form of a paste. Deionized water was then added in order to adjust the viscosity to 2000±100 mPa×s (measured by a B-type viscometer at 12 rpm) and thereby prepare a slurry composition for lithium ion secondary battery negative electrode-use. Negative electrode producibility was evaluated based on the solid content concentration of this slurry composition. The results are shown in Table 2.

<Production of Negative Electrode for Lithium Ion Secondary Battery-Use>

A comma coater was used to apply the aforementioned slurry composition for lithium ion secondary battery negative electrode-use onto the surface of copper foil of 20 μm in thickness, used as a current collector, so that the application amount of the slurry composition was from 5.8 mg/cm$^2$ to 6.2 mg/cm$^2$. The copper foil onto which the slurry composition for lithium ion secondary battery negative electrode-use had been applied was conveyed inside an 80° C. oven for 2 minutes and a 110° C. oven for 2 minutes at a speed of 300 mm/minute in order to dry the slurry composition on the copper foil and thereby obtain a negative electrode web.

The resultant negative electrode web was pressed using a roll press so as to have a density of from 1.63 g/cm$^3$ to 1.67 g/cm$^3$. The pressed negative electrode web was then left for 4 hours under vacuum conditions at an ambient temperature of 105° C. in order to remove moisture, and a negative electrode was obtained as a result. The negative electrode was used in order to evaluate close adherence between the negative electrode mixed material layer and the current collector. The results are shown in Table 2.

<Production of Positive Electrode for Lithium Ion Secondary Battery-Use>

A planetary mixer was charged with 100 parts of $LiCoO_2$ as a positive electrode active material, 2 parts of acetylene black (HS-100 produced by Denki Kagaku Kogyo Kabushiki Kaisha) as a conductive material, and 2 parts of PVDF (polyvinylidene fluoride, KF-1100 produced by Kureha Corporation) as a binding material. 2-Methylpyrrolidone was also added as a dispersion medium such that the total solid content concentration was 67%, and mixing was performed to yield a slurry composition for lithium ion secondary battery positive electrode-use.

A comma coater was used to apply the resultant slurry composition for lithium ion secondary battery positive electrode-use onto aluminum foil of 20 mm in thickness, used as a current collector, so that the application amount of the slurry composition was from 26.3 $mg/cm^2$ to 27.7 $mg/cm^2$. Thereafter, the aluminum foil onto which the slurry composition for lithium ion secondary battery positive electrode-use had been applied was conveyed inside a 60° C. oven for 2 minutes at a speed of 0.5 m/minute in order to dry the slurry composition. Heat treatment was subsequently performed for 2 minutes at a temperature of 120° C. to obtain a positive electrode web.

The resultant positive electrode web was pressed using a roll press so as to have a density of from 3.40 $g/cm^3$ to 3.50 $g/cm^3$. The pressed positive electrode web was then left for 3 hours under vacuum conditions at an ambient temperature of 120° C. in order to remove the dispersion medium, and a positive electrode was obtained as a result.

<Production of Lithium Ion Secondary Battery>

A wound cell (discharge capacity equivalent to 800 mAh) was produced using a single-layer separator made from polypropylene and the aforementioned negative and positive electrodes and was placed inside an aluminum packing material. Thereafter, the aluminum packing material was filled with an $LiPF_6$ solution having a concentration of 1.0 M as an electrolysis solution (mixed solvent of 3/7 (volume ratio) ethylene carbonate (EC)/ethyl methyl carbonate (EMC) used as solvent; 2 volume % (solvent ratio) of vinylene carbonate contained as additive). The aluminum packing material was then closed with heat sealing at a temperature of 150° C. to tightly seal up the opening of the aluminum packing material, and a lithium ion secondary battery was accordingly produced. The lithium ion secondary battery was used in order to evaluate rate characteristics, cycle characteristics, and preservation stability. The results are shown in Table 2.

Examples 2, 3

A paste composition for lithium ion secondary battery negative electrode-use, a slurry composition for lithium ion secondary battery negative electrode-use, a negative electrode for lithium ion secondary battery-use, a positive electrode for lithium ion secondary battery-use, and a lithium ion secondary battery were produced in the same way as in Example 1, with the exception that, during preparation of the slurry composition for lithium ion secondary battery negative electrode-use, an aqueous dispersion of a particulate polymer composed of ABS and an aqueous dispersion of a particulate polymer composed of ACR were respectively used instead of the aqueous dispersion of a particulate polymer composed of SBR. The evaluations were then performed for the same categories as in Example 1. The results are shown in Table 2.

Examples 4-7 and 16-18

A paste composition for lithium ion secondary battery negative electrode-use, a slurry composition for lithium ion secondary battery negative electrode-use, a negative electrode for lithium ion secondary battery-use, a positive electrode for lithium ion secondary battery-use, and a lithium ion secondary battery were produced in the same way as in Example 1, with the exception that, during preparation of the slurry composition for lithium ion secondary battery negative electrode-use and the paste composition for lithium ion secondary battery negative electrode-use, the water-soluble polymers of Production Examples 2-5 and 8-10 were respectively used instead of the water-soluble polymer of Production Example 1. The evaluations were then performed for the same categories as in Example 1. The results are shown in Table 2.

Example 8

A paste composition for lithium ion secondary battery negative electrode-use, a slurry composition for lithium ion secondary battery negative electrode-use, a negative electrode for lithium ion secondary battery-use, a positive electrode for lithium ion secondary battery-use, and a lithium ion secondary battery were produced in the same way as in Example 1, with the exception that, during preparation of the slurry composition for lithium ion secondary battery negative electrode-use, an aqueous solution of carboxymethyl cellulose (MAC350HC produced by Nippon Paper Chemical Co., Ltd.) was used instead of an aqueous solution of the water-soluble polymer of Production Example 1. The evaluations were then performed for the same categories as in Example 1. The results are shown in Table 2.

Example 9

<Production of Composite Particles>

Composite particles for lithium ion secondary battery negative electrode-use (volume-average particle diameter D50: 35 μm) were obtained by subjecting a paste composition for lithium ion secondary battery negative electrode-use obtained in the same way as in Example 1 to spray-drying granulation using a spray dryer (OC-16 produced by Ohkawara Kakohki Co., Ltd.) under the following conditions: speed of rotary disc atomizer (diameter 65 mm), 25,000 rpm; hot air temperature, 150° C.; temperature of particle collection outlet, 90° C.

<Preparation of Slurry Composition for Lithium Ion Secondary Battery Negative Electrode-Use>

To the composite particles obtained as described above, 75 parts of artificial graphite as a carbon-based negative electrode active material and 1.0 parts by solid content equivalents of a 4.5% aqueous solution of the water-soluble polymer of Production Example 1 were added and were mixed at 30 rpm for 30 minutes in a planetary mixer equipped with a disper blade. Subsequently, 0.5 parts by solid content equivalents of an aqueous dispersion of SBR was added as a particulate polymer. The result was then mixed at 20 rpm for 15 minutes to yield a slurry in the form of a paste. Deionized water was then added in order to adjust the viscosity to 2000±100 mPa×s (measured by a B-type viscometer at 12 rpm) and thereby prepare a slurry composition for lithium ion secondary battery negative electrode-use. Negative electrode producibility was evaluated based on the solid content concentration of this slurry composition. The results are shown in Table 2.

<Production of Negative Electrode for Lithium Ion Secondary Battery-Use and Lithium Ion Secondary Battery>

A negative electrode for lithium ion secondary battery-use was produced in the same way as in Example 1, with the exception that the slurry composition for lithium ion secondary battery negative electrode-use obtained as described above was used. The negative electrode was used in order to evaluate close adherence between the negative electrode mixed material layer and the current collector. The results are shown in Table 2.

The above-described negative electrode and a positive electrode obtained in the same way as in Example 1 were then used to produce a lithium ion secondary battery in the same way as in Example 1. The lithium ion secondary battery was used in order to evaluate rate characteristics, cycle characteristics, and preservation stability. The results are shown in Table 2.

Examples 10, 13

A paste composition for lithium ion secondary battery negative electrode-use, a slurry composition for lithium ion secondary battery negative electrode-use, a negative electrode for lithium ion secondary battery-use, a positive electrode for lithium ion secondary battery-use, and a lithium ion secondary battery were produced in the same way as in Example 1, with the exception that the added amounts of artificial graphite and water-soluble polymer during preparation of the paste composition for lithium ion secondary battery negative electrode-use and the added amount of artificial graphite during preparation of the slurry composition for lithium ion secondary battery negative electrode-use were changed as indicated in Table 2. The evaluations were then performed for the same categories as in Example 1. The results are shown in Table 2.

Example 11

A paste composition for lithium ion secondary battery negative electrode-use, a slurry composition for lithium ion secondary battery negative electrode-use, a negative electrode for lithium ion secondary battery-use, a positive electrode for lithium ion secondary battery-use, and a lithium ion secondary battery were produced in the same way as in Example 1, with the exception that the added amounts of water-soluble polymer and particulate polymer were changed during preparation of the slurry composition for lithium ion secondary battery negative electrode-use as indicated in Table 2, and the solid content of an aqueous solution of carboxymethyl cellulose (MAC350HC produced by Nippon Paper Chemical Co., Ltd.) as indicated in Table 2 was added. The evaluations were then performed for the same categories as in Example 1. The results are shown in Table 2.

Example 12

A paste composition for lithium ion secondary battery negative electrode-use, a slurry composition for lithium ion secondary battery negative electrode-use, a negative electrode for lithium ion secondary battery-use, a positive electrode for lithium ion secondary battery-use, and a lithium ion secondary battery were produced in the same way as in Example 1, with the exception that the added amount of water-soluble polymer during preparation of the paste composition for lithium ion secondary battery negative electrode-use and the added amount of particulate polymer during preparation of the slurry composition for lithium ion secondary battery negative electrode-use were changed as indicated in Table 2. The evaluations were then performed for the same categories as in Example 1. The results are shown in Table 2.

Example 14

A paste composition for lithium ion secondary battery negative electrode-use, a slurry composition for lithium ion secondary battery negative electrode-use, a negative electrode for lithium ion secondary battery-use, a positive electrode for lithium ion secondary battery-use, and a lithium ion secondary battery were produced in the same way as in Example 10, with the exception that the added amount of water-soluble polymer during preparation of the paste composition for lithium ion secondary battery negative electrode-use was changed as indicated in Table 2. The evaluations were then performed for the same categories as in Example 1. The results are shown in Table 2.

Example 15

A paste composition for lithium ion secondary battery negative electrode-use, a slurry composition for lithium ion secondary battery negative electrode-use, a negative electrode for lithium ion secondary battery-use, a positive electrode for lithium ion secondary battery-use, and a lithium ion secondary battery were produced in the same way as in Example 1, with the exception that the added amount of water-soluble polymer during preparation of the paste composition for lithium ion secondary battery negative electrode-use was changed as indicated in Table 2. The evaluations were then performed for the same categories as in Example 1. The results are shown in Table 2.

Comparative Example 1

A negative electrode for lithium ion secondary battery-use, a positive electrode for lithium ion secondary battery-use, and a lithium ion secondary battery were produced in the same way as in Example 1, except for using a slurry composition for lithium ion secondary battery negative electrode-use prepared as described below, without preparing a paste composition for lithium ion secondary battery negative electrode-use. The evaluations were then performed for the same categories as in Example 1. The results are shown in Table 2.

<Preparation of Slurry Composition for Lithium Ion Secondary Battery Negative Electrode-Use>

First, 20 parts of $SiO_x$ as a silicon-based negative electrode active material, 80 parts of artificial graphite as a carbon-based negative electrode active material, and 4.0 parts by solid content equivalents of a 4.5% aqueous solution of a water-soluble polymer were added and were mixed at 30 rpm for 30 minutes in a planetary mixer equipped with a disper blade. Subsequently, 0.5 parts by solid content equivalents of an aqueous dispersion of SBR was added as a particulate polymer. The result was then mixed at 20 rpm for 15 minutes to yield a slurry in the form of a paste. Deionized water was then added in order to adjust the viscosity to 2000±100 mPa×s (measured by a B-type viscometer at 12 rpm) and thereby prepare a slurry composition for lithium ion secondary battery negative electrode-use.

Comparative Examples 2, 3

A paste composition for lithium ion secondary battery negative electrode-use, a slurry composition for lithium ion secondary battery negative electrode-use, a negative electrode for lithium ion secondary battery-use, a positive electrode for lithium ion secondary battery-use, and a lithium ion secondary battery were produced in the same way as in Example 1, with the exception that, during preparation of the paste composition for lithium ion secondary battery negative electrode-use, the water-soluble polymers of Production Examples 6 and 7 were respectively used instead of the water-soluble polymer of Production Example 1. The evaluations were then performed for the same categories as in Example 1. The results are shown in Table 2.

Comparative Example 4

A paste composition for lithium ion secondary battery negative electrode-use, a slurry composition for lithium ion secondary battery negative electrode-use, a negative electrode for lithium ion secondary battery-use, a positive electrode for lithium ion secondary battery-use, and a lithium ion secondary battery were produced in the same way as in Example 8, with the exception that, during preparation of the paste composition for lithium ion secondary battery negative electrode-use, a lithium salt of a polyacrylic acid (yielded by preparing a 1% aqueous solution of polycarboxylic acid (produced by Aldrich, molecular weight=3 million) to a pH of 8 with lithium hydroxide (Wako Pure Chemical Industries, Ltd., special grade chemical)) was used instead of the water-soluble polymer of Production Example 1. The evaluations were then performed for the same categories as in Example 1. The results are shown in Table 2.

In the Tables below:
"AA" represents acrylic acid;
"AAm" represents acrylamide;
"DMAAm" represents dimethacrylamide;
"PEGDA" represents polyethylene glycol diacrylate;
"PTMGDA" represents polytetramethylene glycol diacrylate;
"AMPS" represents 2-acrylamide-2-methylpropane sulfonic acid;
"MMA" represents methyl methacrylate;
"Si active material" represents silicon-based negative electrode active material;
"Carbon active material" represents carbon-based negative electrode active material;
"CMC" represents carboxymethyl cellulose; and
"PAA" represents a lithium salt of polyacrylic acid.

TABLE 1

| | | Production Example 1 | Production Example 2 | Production Example 3 | Production Example 4 | Production Example 5 | Production Example 6 | Production Example 7 | Production Example 8 | Production Example 9 | Production Example 10 |
|---|---|---|---|---|---|---|---|---|---|---|---|
| Ethylenically unsaturated carboxylic acid compound (A) | Type | AA | AA | AA | AA | AA | AA | AA | AA | AA | AA |
| | Percentage content [mass %] | 25.0 | 50.0 | 75.0 | 24.0 | 25.0 | 10.0 | 80.0 | 25.0 | 25.0 | 25.0 |
| Compound (B) | Type | AAm | AAm | AAm | AAm | AAm | AAm | AAm | DMAAm | AAm | AAm |
| | Percentage content [mass %] | 75.0 | 50.0 | 25.0 | 75.0 | 70.0 | 80.0 | 10.0 | 75.0 | 64.0 | 64.7 |
| Multifunctional compound (C) | Type | — | — | — | PEGDA | PEGDA | — | — | — | PTMGDA | PTMGDA |
| | Percentage content [mass %] | — | — | — | 1.0 | 5.0 | — | — | — | 1.0 | 0.3 |
| Compound (D) | Type | — | — | — | — | — | — | — | — | AMPS | AMPS |
| | Percentage content [mass %] | — | — | — | — | — | — | — | — | 10.0 | 10.0 |
| Other compound | Type | — | — | — | — | — | MMA | MMA | — | — | — |
| | Percentage content [mass %] | — | — | — | — | — | 10.0 | 10.0 | — | — | — |
| Degree of swelling in electrolysis solution [mass %] | | 105 | 108 | 110 | 105 | 115 | 125 | 125 | 105 | 105 | 105 |
| A/B [—] | | 0.33 | 1.00 | 3.00 | 0.32 | 0.36 | 0.13 | 8.00 | 0.33 | 0.39 | 0.39 |
| (A + D)/B [—] | | — | — | — | — | — | — | — | — | 0.55 | 0.54 |

TABLE 2

| | | | | Example 1 | Example 2 | Example 3 | Example 4 | Example 5 | Example 6 | Example 7 |
|---|---|---|---|---|---|---|---|---|---|---|
| Slurry composition | Paste or composite particles | | Form | paste | paste | paste | paste | paste | paste | paste |
| | | Si active material | Type | SiOx | SiOx | SiOx | SiOx | SiOx | SiOx | SiOx |
| | | | Amount [parts by mass] | 20 | 20 | 20 | 20 | 20 | 20 | 20 |
| | | Carbon active material | Type | artificial graphite | artificial graphite | artificial graphite | artificial graphite | artificial graphite | artificial graphite | artificial graphite |
| | | | Amount [parts by mass] | 5 | 5 | 5 | 5 | 5 | 5 | 5 |

TABLE 2-continued

|  |  |  |  | | | | | | |
|---|---|---|---|---|---|---|---|---|---|
|  |  | Water soluble polymer | Type | Production Example 1 | Production Example 1 | Production Example 1 | Production Example 2 | Production Example 3 | Production Example 4 | Production Example 5 |
|  |  |  | Amount [parts by mass] | 3 | 3 | 3 | 3 | 3 | 3 | 3 |
|  |  | Blending amount of water-soluble polymer per 100 parts by mass of Si active material [parts by mass] |  | 15 | 15 | 15 | 15 | 15 | 15 | 15 |
|  |  | Percentage content of Si active material in negative electrode active material [mass %] |  | 80.0 | 80.0 | 80.0 | 80.0 | 80.0 | 80.0 | 80.0 |
| Components other than the above (added at the time of slurry preparation) | Carbon active material | Type | artificial graphite | artificial graphite | artificial graphite | artificial graphite | artificial graphite | artificial graphite | artificial graphite |
|  |  | Amount [parts by mass] | 75 | 75 | 75 | 75 | 75 | 75 | 75 |
|  | Si active material | Type | — | — | — | — | — | — | — |
|  |  | Amount [parts by mass] | — | — | — | — | — | — | — |
|  | Water-soluble polymer | Type | Production Example 1 | Production Example 1 | Production Example 1 | Production Example 2 | Production Example 3 | Production Example 4 | Production Example 5 |
|  |  | Amount [parts by mass] | 1 | 1 | 1 | 1 | 1 | 1 | 1 |
|  | Particulate polymer | Type | SBR | ABS | ACR | SBR | SBR | SBR | SBR |
|  |  | Amount [parts by mass] | 0.5 | 0.5 | 0.5 | 0.5 | 0.5 | 0.5 | 0.5 |
|  | Thickener | Type | — | — | — | — | — | — | — |
|  |  | Amount [parts by mass] | — | — | — | — | — | — | — |
| Producibility of negative electrode |  |  |  | C | C | C | C | C | B | B |
| Close adherence between negative-electrode mixed material layer and current collector |  |  |  | B | B | B | B | B | B | B |
| Rate characteristics |  |  |  | A | A | A | A | A | A | A |
| Cycle characteristics |  |  |  | A | B | B | A | A | A | A |
| Preservation stability |  |  |  | A | A | B | A | B | A | A |

|  |  |  |  | Example 8 | Example 9 | Example 10 | Example 11 | Example 12 | Example 13 |
|---|---|---|---|---|---|---|---|---|---|
| Slurry composition | Paste or composite particles |  | Form | paste | composite particles | paste | paste | paste | paste |
|  |  | Si active material | Type | SiOx | SiOx | SiOx | SiOx | SiOx | SiOx |
|  |  |  | Amount [parts by mass] | 20 | 20 | 20 | 20 | 20 | 20 |
|  |  | Carbon active material | Type | artificial graphite | artificial graphite | artificial graphite | artificial graphite | artificial graphite | artificial graphite |
|  |  |  | Amount [parts by mass] | 5 | 5 | 3 | 5 | 5 | 1 |
|  |  | Water soluble polymer | Type | Production Example 1 | Production Example 1 | Production Example 1 | Production Example 1 | Production Example 1 | Production Example 1 |
|  |  |  | Amount [parts by mass] | 3 | 3 | 5 | 3 | 5 | 7 |
|  |  | Blending amount of water-soluble polymer per 100 parts by mass of Si active material [parts by mass] |  | 15 | 15 | 25 | 15 | 25 | 35 |
|  |  | Percentage content of Si active material in negative electrode active material [mass %] |  | 80.0 | 80.0 | 87.0 | 80.0 | 80.0 | 95.2 |
| Components other than the above (added at the time of slurry preparation) | Carbon active material | Type | artificial graphite | artificial graphite | artificial graphite | artificial graphite | artificial graphite | artificial graphite |
|  |  | Amount [parts by mass] | 75 | 75 | 77 | 75 | 75 | 79 |
|  | Si active material | Type | — | — | — | — | — | — |
|  |  | Amount [parts by mass] | — | — | — | — | — | — |

TABLE 2-continued

| | | | | | | | | |
|---|---|---|---|---|---|---|---|---|
| | Water-soluble polymer | Type | — | Production Example 1 | Production Example 1 | Production Example 1 | Production Example 1 | Production Example 1 |
| | | Amount [parts by mass] | — | 1 | 1 | 0.5 | 1 | 1 |
| | Particulate polymer | Type | SBR | SBR | SBR | SBR | SBR | SBR |
| | | Amount [parts by mass] | 0.5 | 0.5 | 0.5 | 1.5 | 1.5 | 0.5 |
| | Thickener | Type | CMC | — | — | CMC | — | — |
| | | Amount [parts by mass] | 1 | — | — | 0.5 | — | — |
| Producibility of negative electrode | | | C | A | C | C | C | C |
| Close adherence between negative-electrode mixed material layer and current collector | | | A | B | B | A | A | B |
| Rate characteristics | | | B | A | B | A | A | C |
| Cycle characteristics | | | B | A | A | A | A | A |
| Preservation stability | | | A | A | A | A | A | A |

| | | | | | Example 14 | Example 15 | Example 16 | Example 17 | Example 18 |
|---|---|---|---|---|---|---|---|---|---|
| Slurry composition | Paste or composite particles | | Form | | paste | paste | paste | paste | paste |
| | | Si active material | Type | | SiOx | SiOx | SiOx | SiOx | SiOx |
| | | | Amount [parts by mass] | | 20 | 20 | 20 | 20 | 20 |
| | | Carbon active material | Type | | artificial graphite | artificial graphite | artificial graphite | artificial graphite | artificial graphite |
| | | | Amount [parts by mass] | | 3 | 5 | 5 | 5 | 5 |
| | | Water soluble polymer | Type | | Production Example 1 | Production Example 1 | Production Example 8 | Production Example 9 | Production Example 10 |
| | | | Amount [parts by mass] | | 3 | 1 | 3 | 3 | 3 |
| | | Blending amount of water-soluble polymer per 100 parts by mass of Si active material [parts by mass] | | | 15 | 5 | 15 | 15 | 15 |
| | | Percentage content of Si active material in negative electrode active material [mass %] | | | 87.0 | 80.0 | 80.0 | 80.0 | 80.0 |
| | Components other than the above (added at the time of slurry preparation) | Carbon active material | Type | | artificial graphite | artificial graphite | artificial graphite | artificial graphite | artificial graphite |
| | | | Amount [parts by mass] | | 77 | 75 | 75 | 75 | 75 |
| | | Si active material | Type | | — | — | — | — | — |
| | | | Amount [parts by mass] | | — | — | — | — | — |
| | | Water-soluble polymer | Type | | Production Example 1 | Production Example 1 | Production Example 8 | Production Example 9 | Production Example 10 |
| | | | Amount [parts by mass] | | 1 | 1 | 1 | 1 | 1 |
| | | Particulate polymer | Type | | SBR | SBR | SBR | SBR | SBR |
| | | | Amount [parts by mass] | | 0.5 | 0.5 | 0.5 | 0.5 | 0.5 |
| | | Thickener | Type | | — | — | — | — | — |
| | | | Amount [parts by mass] | | — | — | — | — | — |
| Producibility of negative electrode | | | | | C | C | C | B | B |
| Close adherence between negative-electrode mixed material layer and current collector | | | | | B | B | B | A | A |
| Rate characteristics | | | | | B | B | A | A | A |
| Cycle characteristics | | | | | A | B | A | B | B |
| Preservation stability | | | | | A | A | A | A | A |

TABLE 2-continued

| | | | | Comparative Example 1 | Comparative Example 2 | Comparative Example 3 | Comparative Example 4 |
|---|---|---|---|---|---|---|---|
| Slurry composition | Paste or composite particles | | Form | — | paste | paste | paste |
| | | Si active material | Type | — | SiOx | SiOx | SiOx |
| | | | Amount [parts by mass] | — | 20 | 20 | 20 |
| | | Carbon active material | Type | — | artificial graphite | artificial graphite | artificial graphite |
| | | | Amount [parts by mass] | — | 5 | 5 | 5 |
| | | Water soluble polymer | Type | — | Production Example 6 | Production Example 7 | PAA |
| | | | Amount [parts by mass] | — | 3 | 3 | 3 |
| | | Blending amount of water-soluble polymer per 100 parts by mass of Si active material [parts by mass] | | — | 15 | 15 | 15 |
| | | Percentage content of Si active material in negative electrode active material [mass %] | | — | 80.0 | 80.0 | 80.0 |
| | Components other than the above (added at the time of slurry preparation) | Carbon active material | Type | artificial graphite | artificial graphite | artificial graphite | artificial graphite |
| | | | Amount [parts by mass] | 80 | 75 | 75 | 75 |
| | | Si active material | Type | SiOx | — | — | — |
| | | | Amount [parts by mass] | 20 | — | — | — |
| | | Water-soluble polymer | Type | Production Example 1 | Production Example 1 | Production Example 1 | — |
| | | | Amount [parts by mass] | 4 | 1 | 1 | — |
| | | Particulate polymer | Type | SBR | SBR | SBR | SBR |
| | | | Amount [parts by mass] | 0.5 | 0.5 | 0.5 | 0.5 |
| | | Thickener | Type | — | — | — | CMC |
| | | | Amount [parts by mass] | — | — | — | 1 |
| Producibility of negative electrode | | | | D | C | C | D |
| Close adherence between negative-electrode mixed material layer and current collector | | | | C | B | B | D |
| Rate characteristics | | | | C | C | C | D |
| Cycle characteristics | | | | C | D | C | D |
| Preservation stability | | | | D | C | D | D |

Examples 1-18 and Comparative Examples 1-4 in Table 2 demonstrate that in Examples 1-18, excellent cycle characteristics of a lithium ion secondary battery using a silicon-based negative electrode active material were obtained. Examples 1-18 also demonstrate that the producibility of the negative electrode and the close adherence between the negative electrode mixed material layer and the current collector were ensured, the internal resistance of the lithium ion secondary battery was sufficiently reduced, and furthermore excellent preservation stability was obtained.

Moreover, Examples 1-3 in Table 2 demonstrate that the cycle characteristics and preservation stability of the lithium ion secondary battery could be improved by changing the type of particulate polymer.

Furthermore, Examples 1, 4-7, and 16-18 in Table 2 demonstrate that the producibility of the negative electrode and the preservation stability and cycle characteristics of the lithium ion secondary battery could be improved by changing the type and blending proportions of monomers used in preparation of the water-soluble polymer.

Examples 1, 8, 11, 12, and 15 in Table 2 demonstrate that the close adherence between the negative electrode mixed material layer and the current collector could be improved, the cycle characteristics of the lithium ion secondary battery could be improved, and the internal resistance of the lithium ion secondary battery could be reduced by changing the amount of the water-soluble polymer, particulate polymer, and thickener added when preparing the paste composition and the slurry composition.

Additionally, Examples 1 and 9 in Table 2 demonstrate that, instead of using the paste composition, using composite particles formed by subjecting the paste composition to dry granulation could improve the producibility of the negative electrode.

Examples 1, 10, 13, and 14 of Table 2 also demonstrate that the internal resistance of the lithium ion secondary battery could be lowered by changing the percentage content of the silicon-based negative electrode active material in the negative electrode active material when preparing the paste composition.

INDUSTRIAL APPLICABILITY

According to the present disclosure, it is possible to provide a material for slurry composition-use that allows formation of a slurry composition for lithium ion secondary battery negative electrode-use which in turn enables a lithium ion secondary battery using a silicon-based negative electrode active material to achieve excellent cycle characteristics.

According to the present disclosure, it is also possible to provide a slurry composition for lithium ion secondary battery negative electrode-use that allows formation of a negative electrode mixed material layer which in turn enables a lithium ion secondary battery using a silicon-based negative electrode active material to achieve excellent cycle characteristics.

Furthermore, according to the present disclosure, it is possible to provide a negative electrode for lithium ion secondary battery-use that allows a lithium ion secondary battery using a silicon-based negative electrode active material to achieve excellent cycle characteristics.

According to the present disclosure, it is also possible to provide a lithium ion secondary battery having high battery capacity and excellent cycle characteristics.

The invention claimed is:

1. A paste composition for lithium ion secondary battery negative electrode-use, comprising:
    a negative electrode active material and a water-soluble polymer; wherein
    the negative electrode active material includes a silicon-based negative electrode active material, and a percentage content of the silicon-based negative electrode active material in the negative electrode active material is at least 30 mass %;
    the water-soluble polymer is obtained through polymerization of a monomer composition including:
        an ethylenically unsaturated carboxylic acid compound (A) composed of either or both of an ethylenically unsaturated carboxylic acid and an ethylenically unsaturated carboxylic acid salt; and
        a copolymerizable compound (B) that has an ethylenically unsaturated bond and a solubility of at least 7 g in 100 g of water at 20° C.;
    in the monomer composition, a percentage content of the ethylenically unsaturated carboxylic acid compound (A) among all monomers is at least 20.0 mass % and no greater than 79.5 mass %, and a percentage content of the compound (B) among all monomers is at least 20.0 mass % and no greater than 79.5 mass %;
    the water-soluble polymer has a degree of swelling in electrolysis solution of less than 120%; and
    a content of the water-soluble polymer is at least 3 parts by mass and less than 500 parts by mass per 100 parts by mass of the silicon-based negative electrode active material.

2. The paste composition for lithium ion secondary battery negative electrode-use of claim 1, wherein the monomer composition further includes a multifunctional compound (C) having a polyoxyalkylene structure and at least two ethylenically unsaturated bonds, and a percentage content of the multifunctional compound (C) among all monomers in the monomer composition is at least 0.1 mass % and no greater than 20.0 mass %.

3. The paste composition for lithium ion secondary battery negative electrode-use of claim 1, wherein a value obtained by dividing the percentage content of the ethylenically unsaturated carboxylic acid compound (A) among all monomers in the monomer composition by the percentage content of the compound (B) among all monomers in the monomer composition is less than 1.5.

4. The paste composition for lithium ion secondary battery negative electrode-use of claim 1, wherein the monomer composition further includes a compound (D) composed of at least one selected from the group consisting of an ethylenically unsaturated sulfonic acid, an ethylenically unsaturated sulfonic acid salt, an ethylenically unsaturated phosphoric acid, and an ethylenically unsaturated phosphoric acid salt, and a percentage content of the compound (D) among all monomers in the monomer composition is at least 0.4 mass % and no greater than 30.0 mass %.

5. The paste composition for lithium ion secondary battery negative electrode-use of claim 4, wherein a value obtained by dividing a sum of the percentage content of the ethylenically unsaturated carboxylic acid compound (A) among all monomers in the monomer composition and the percentage content of the compound (D) among all monomers in the monomer composition by the percentage content of the compound (B) among all monomers in the monomer composition is less than 1.5.

6. The paste composition for lithium ion secondary battery negative electrode-use of claim 1, wherein the water-soluble polymer includes a lithium carboxylate group.

7. Composite particles for lithium ion secondary battery negative electrode-use obtained by subjecting the paste composition for lithium ion secondary battery negative electrode-use of claim 1 to dry granulation.

8. A slurry composition for lithium ion secondary battery negative electrode-use prepared using the paste composition for lithium ion secondary battery negative electrode-use of claim 1.

9. A negative electrode for lithium ion secondary battery-use comprising, on a current collector, a negative electrode mixed material layer prepared using the slurry composition for lithium ion secondary battery negative electrode-use of claim 8.

10. A lithium ion secondary battery comprising:
    a positive electrode, a negative electrode, an electrolysis solution, and a separator; wherein
    the negative electrode is the negative electrode for lithium ion secondary battery-use of claim 9.

11. A slurry composition for lithium ion secondary battery negative electrode-use prepared using the composite particles for lithium ion secondary battery negative electrode-use of claim 7.

12. A negative electrode for lithium ion secondary battery-use comprising, on a current collector, a negative electrode mixed material layer prepared using the slurry composition for lithium ion secondary battery negative electrode-use of claim 11.

13. A lithium ion secondary battery comprising:
    a positive electrode, a negative electrode, an electrolysis solution, and a separator; wherein
    the negative electrode is the negative electrode for lithium ion secondary battery-use of claim 12.

* * * * *